United States Patent
Yoo et al.

(10) Patent No.: US 8,787,017 B2
(45) Date of Patent: Jul. 22, 2014

(54) MOBILE TERMINAL

(75) Inventors: Inseok Yoo, Seoul (KR); Youngkyu Kim, Seoul (KR); Huiseob Byun, Seoul (KR); Myoungdae Han, Seoul (KR); Chiyoung Kim, Seoul (KR); Changbai Won, Seoul (KR)

(73) Assignee: LG Electronics Inc., Seoul (KR)

(*) Notice: Subject to any disclaimer, the term of this patent is extended or adjusted under 35 U.S.C. 154(b) by 248 days.

(21) Appl. No.: 13/419,815

(22) Filed: Mar. 14, 2012

(65) Prior Publication Data
US 2012/0236480 A1    Sep. 20, 2012

(30) Foreign Application Priority Data

Mar. 14, 2011  (KR) .................. 10-2011-0022431
May 13, 2011  (KR) .................. 10-2011-0045167

(51) Int. Cl.
*G06F 1/16*    (2006.01)
*H04M 1/02*    (2006.01)

(52) U.S. Cl.
CPC ................................. *H04M 1/0262* (2013.01)
USPC ..................................... 361/679.55; 292/163

(58) Field of Classification Search
CPC ..................................................... H04M 1/0262
USPC ............................... 361/679.55; 292/163
See application file for complete search history.

(56) References Cited

U.S. PATENT DOCUMENTS 5,566,050 A * 10/1996 Seto et al. ............. 361/679.43
5,764,477 A *  6/1998 Ohgami et al. ........ 361/679.55
5,905,632 A *  5/1999 Seto et al. ............. 361/679.55
6,159,632 A * 12/2000 Osawa ........................ 429/100
6,515,450 B1 *  2/2003 Kaiho et al. ................. 320/112
6,633,483 B2 * 10/2003 Akagi et al. ............. 361/679.4
7,068,495 B2 *  6/2006 Luo et al. ............... 361/679.56
7,751,181 B2 *  7/2010 Chen ...................... 361/679.01
7,766,234 B2 *  8/2010 Nam ....................... 361/679.02
7,839,627 B2 * 11/2010 Tanaka et al. ............. 361/679.3
7,892,668 B2 *  2/2011 Choi ........................... 429/97
8,072,749 B1 * 12/2011 Chen ...................... 361/679.55
8,085,529 B2 * 12/2011 Zhang .................... 361/679.55
8,205,310 B2 *  6/2012 Shi et al. ..................... 292/163
8,297,666 B2 * 10/2012 Rajagopal et al. ......... 292/163
8,322,760 B2 * 12/2012 Wu et al. .................... 292/163
8,373,975 B2 *  2/2013 Liang et al. ............. 361/679.56
8,470,466 B2 *  6/2013 Liang .......................... 429/97

(Continued)

FOREIGN PATENT DOCUMENTS

CN          2763985 Y     3/2006
CN         19505573 A     1/2007
CN        101673812 A     3/2010

*Primary Examiner* — Lisa Lea Edmonds
(74) *Attorney, Agent, or Firm* — Ked & Associates, LLP

(57) ABSTRACT

A mobile terminal is disclosed, by which a user is facilitated to detach a battery cover from a terminal body and by which the exterior beauty of the mobile terminal is enhanced. The present invention includes a body including a rear case having a front part and a rear part, a battery received in the body, a battery cover detachably provided between the front part and the rear part to protect the battery against external environment, a guide member fixed to an inner surface of one end portion of the battery cover, a moving member received in the guide member to be guided by the guide member to move in front and rear directions, and a hooking member provided within the body, the hooking member including a hooking surface engaged with the moving member to fix the battery cover to the body.

23 Claims, 17 Drawing Sheets

(56) References Cited

U.S. PATENT DOCUMENTS

| | | | |
|---|---|---|---|
| 2004/0224220 A1* | 11/2004 | Wang et al. | 429/96 |
| 2004/0228072 A1* | 11/2004 | Chen et al. | 361/600 |
| 2005/0003860 A1 | 1/2005 | Jung | 455/557 |
| 2007/0218961 A1* | 9/2007 | Luo et al. | 455/575.1 |
| 2009/0262506 A1* | 10/2009 | Shi et al. | 361/727 |
| 2010/0039757 A1* | 2/2010 | Yu | 361/679.01 |
| 2010/0047679 A1* | 2/2010 | An | 429/100 |
| 2010/0244464 A1* | 9/2010 | Rajagopal et al. | 292/163 |
| 2010/0279164 A1* | 11/2010 | Gao | 429/100 |
| 2011/0195289 A1* | 8/2011 | Ouyang | 429/97 |
| 2011/0244311 A1* | 10/2011 | Liang | 429/163 |

* cited by examiner

MOBILE TERMINAL

Pursuant to 35 U.S.C. §119(a), this application claims the benefit of earlier filing date and right of priority to Korean Applications No. 10-2011-0022431, filed on Mar. 14, 2011 and No. 10-2011-0045167, filed on May 13, 2011, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for facilitating a user to detach a battery cover from a terminal body and for enhancing the exterior beauty of the mobile terminal.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

The above-configured terminal is generally provided with a rechargeable battery and a battery cover with which the rechargeable battery is covered. However, in the mobile terminal according to the related art, if the battery cover is detached from the terminal body to exchange the battery, it is inconvenient for a user to detach the battery cover from the terminal body in a manner of fitting a fingernail into a slot formed on the battery cover and then using muscle power to lift the battery cover. In doing so, if the user fails in controlling his muscle power appropriately to detach the battery cover, the user may drop the terminal unintentionally. Moreover, since a battery cover locking device for detachably fixing the battery cover to the terminal body is externally exposed, it may deteriorate the exterior beauty of the mobile terminal.

SUMMARY OF THE INVENTION

Accordingly, the present invention is directed to a mobile terminal that substantially obviates one or more problems due to limitations and disadvantages of the related art.

An object of the present invention is to provide a mobile terminal, by which a user is facilitated to detach a battery cover from a terminal body.

Another object of the present invention is to provide a mobile terminal, by which a battery cover locking device is provided with a simple configuration.

A further object of the present invention is to provide a mobile terminal, by which the exterior beauty of the mobile terminal is enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a body including a rear case having a front part and a rear part, a battery received in the body, a battery cover detachably provided between the front part and the rear part to protect the battery against external environment, a guide member fixed to an inner surface of one end portion of the battery cover, a moving member received in the guide member to be guided by the guide member to move in front and rear directions, and a hooking member provided within the body, the hooking member including a hooking surface engaged with the moving member to fix the battery cover to the body.

Accordingly, the present invention provides the following effects and/or advantages.

First of all, the present invention may facilitate a user to detach a battery cover from a terminal body.

Secondly, the present invention may provide a battery cover locking device with a simple configuration.

Thirdly, the present invention prevents a battery cover locking mechanism from being externally exposed outside the mobile terminal, thereby enhancing the exterior beauty of the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The mobile terminal described in the specification can include cellular phone, smart phone, laptop computer, digital broadcasting terminal, PDA (Personal Digital Assistants), PMP (Portable Multimedia Player), navigation and so on. However, it will be apparent of to persons in this field of art that a configuration of the embodiment described in the specification is applicable to stationary terminals, such as digital TV and desk top computer, if cases are excluded, in which the embodiment is applicable only to the mobile terminal.

Figure 1:
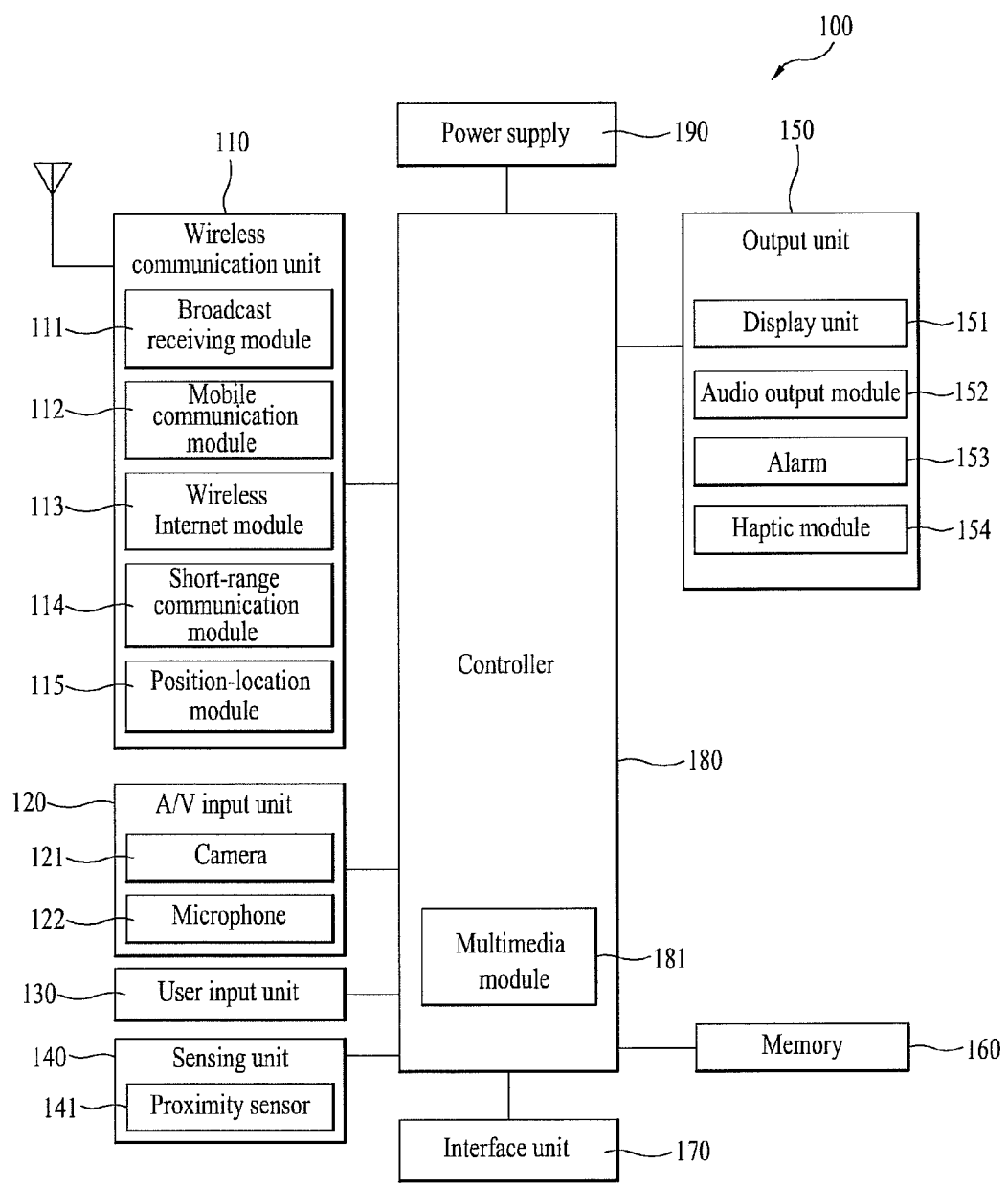
FIG. 1 is a block diagram of a mobile terminal in accordance with an embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Elements of the present invention will be described one by one.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 151.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

The sensing unit 140 detects such a current configuration of the mobile terminal 100 as an open/closed configuration of the mobile terminal 100, a location of the mobile terminal 100, a presence or non-presence of user contact, and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

Meanwhile, the sensing unit 140 may include a proximity sensor 141.

The output unit 150 is configured to output an audio signal, a video signal and/or an alarm signal. And, the output unit 150 may include the display 151, an audio output module 152, an alarm output module 153, a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 151 may be implemented using known display technologies including, for example, a liquid crystal display (LCD), a thin film transistor-display display (TFT-LCD), an organic light-emitting diode display (OLED), a flexible display and a three-dimensional display. The mobile terminal 100 may include one or more of such displays.

Some of the displays can have a transparent or light-transmitting configuration to be externally viewable therethrough. And, such a display can be called a light-transmitting display. TOLED (transparent OLED), AMOLED (active matrix OLED) and the like are representative examples of the light-transmitting displays. And, a rear structure of the display can have the light-transmitting configuration as well. Above structure enables the user to see things positioned in rear of a terminal body through a region of the display unit 151 of the terminal body occupies.

According to an implementation type of the mobile terminal 100, at least two displays 151 can exist in the mobile terminal 100. For instance, a plurality of displays can be arranged on one face of the mobile terminal 100 in a manner of being spaced apart from each other or being built in one body. For another instance, a plurality of displays can be arranged on different faces of the mobile terminal 100, respectively.

In case that the display 151 and a sensor for detecting a touch action (hereinafter called 'touch sensor') of such a pointer as a user's finger, a pen and the like configures a mutual layer structure (hereinafter called 'touchscreen'), it is able to use the display 151 as an input device as well as an output device. In this case, the touch sensor can be configured with a touch film, a touch sheet, a touchpad or the like for example.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know which portion of the display 151 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen.

The memory 160 may include at least one storage medium of such a type as a flash memory type, a hard disk type, a multimedia card micro type, a card type memory (e.g., SD memory, XD memory, etc.), RAM, SRAM (Static Random Access Memory), ROM, EEPROM (Electrically Erasable Programmable Read-Only Memory), PROM (Programmable Read-Only Memory) and the like. Moreover, the mobile terminal 100 is able to operate a web storage that performs a storage function of the memory 160 on Internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 is able to perform a pattern recognizing processing for recognizing a handwriting input or a drawing input performed on the touchscreen into a character and an image, respectively.

The power supply 190 receives an external and/or internal power source and then supplies power required for operations of the respective components, under the control of the controller 180.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 2A:
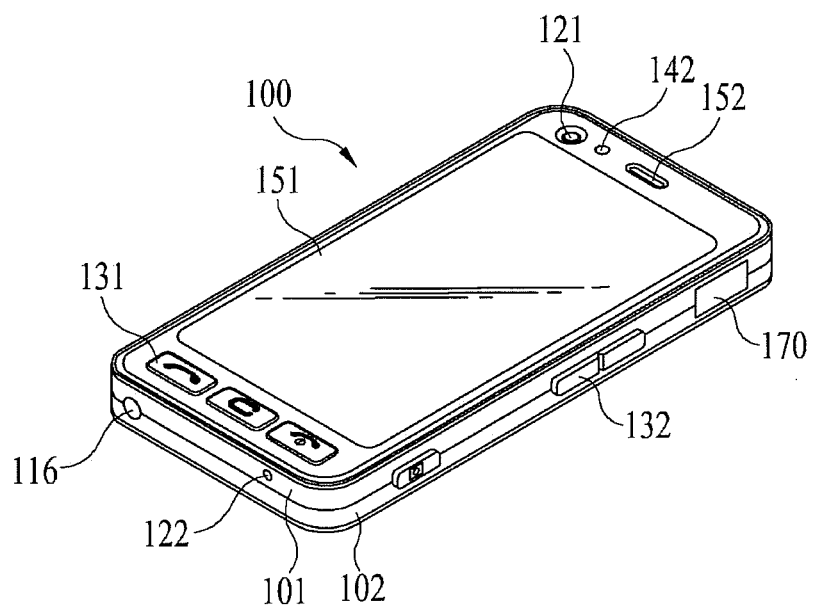
FIG. 2A illustrates a front perspective view of a mobile terminal related to a preferred embodiment of the present invention.

FIG. 2A illustrates a front perspective view of a mobile terminal related to a preferred embodiment of the present invention.

The mobile terminal 100 disclosed herein has a bar type terminal body. However, the present invention is not limited to this, but is applicable to various types of structures of the mobile terminal, such as a slide type, a folder type, a swing type, a swivel type and so on, in which two or more than two bodies are coupled to allow relative motions.

The body includes a case (casing, housing, cover, and so on) which forms an exterior thereof. In the embodiment, the case includes a front case 101 and a rear case 102. Various electronic components are mounted in a space formed between the front case 101 and the rear case 102. There can be at least one intermediate case between the front case 101 and the rear case 102, additionally.

The rear case 102 includes a front part, a rear part and a battery cover detachably fixed between the front part and the rear part. In particular, the front part configures an upper portion of the rear case when the mobile terminal is set upright. And, the rear part configures a lower portion of the rear case when the mobile terminal is set upright.

The cases can be injection moldings of synthetic resin or formed of a metal, such as stainless steel or titanium Ti.

The terminal body, mostly the front case 101, can have a display unit 151, a sound output unit 152, a camera 121, user input units 130/131 and 132, a microphone 122, an interface 170 arranged thereon.

The display unit 151 occupies most of a main surface of the front case 101. The sound output unit 152 and the camera 121 are arranged at a region adjacent to one end of the display unit 151 and the user input unit 132 and the microphone 122 are arranged at a region adjacent to the other end of the display unit 151. The user input unit 132 and the interface 170 can be arranged at sides of the front case 101 and the rear case 102.

The user input unit 130, to be handled for receiving an order to control operation of the mobile terminal 100, can include a plurality of handling units 131 and 132. The handling units 131 and 132, called as a handling portion collectively, can be of any type as far as it can be handled in a tactile manner. Contents to be received by the first and second handling units 131 and 132 can be set in a variety of ways. For an example, the first handling unit 131 can receive orders, such as start, end and scroll, and the second handling unit 132 can receive orders such as control of sound volume from the sound output unit 152, and shifting to a touch sensing mode of the display unit 151, and so on.

Figure 2B:
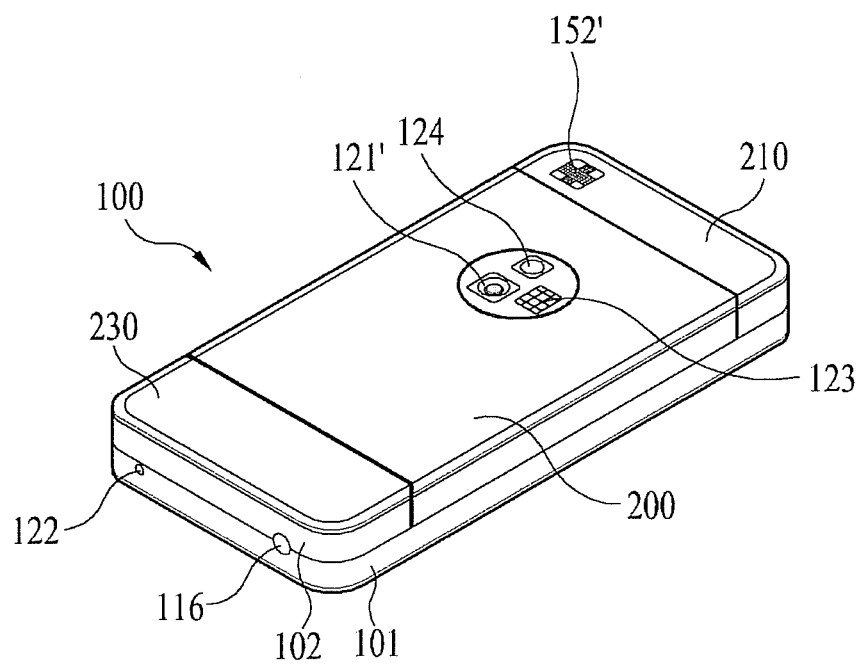
FIG. 2B illustrates a back side perspective view of a mobile terminal related to a preferred embodiment of the present invention.

FIG. 2B illustrates a backside perspective view of a mobile terminal shown in FIG. 2A.

Referring to FIG. 2B, a camera 121' can be mounted to a backside of the terminal body, i.e., on the rear case 102, additionally. The camera 121' has a picture taking direction opposite to the camera 121 (See FIG. 2) actually, and can be a camera having pixels different from the camera 121.

For an example, it is preferable that the camera 121 has low density of pixels such that taking and transmitting a picture of a face of the user to an opposite side can be done properly, and the camera 121' has high density of pixels since there are many cases when the camera 121' takes a general object and stores the picture without transmission directly. The cameras 121 and 121' can be mounted to the terminal body, rotatably or able to pop-up.

A flash 123 and a mirror 124 are arranged adjacent to the camera 121', additionally. The flash 123 illuminates the object when the camera 121' takes the object. The mirror 124 enables the user to see the user's face or so on when the user takes a picture of the user with the user's camera 121'.

A sound output unit 152' can be mounted to the backside of the terminal body, additionally. The sound output unit 152' can implement a stereo function together with the sound output unit 152 (See FIG. 2A), and can be used for implementing a speaker phone mode.

Besides an antenna for communication, the terminal body at a side thereof can have a broadcasting signal reception antenna 124, additionally. The antenna 124 in the broadcast receiving module 111 (See FIG. 1) can be mounted to be able to pull out of the terminal body.

The terminal body has a power supply unit 190 mounted thereto for supplying power to the mobile terminal 100. The power supply unit 190 can be built-in the terminal body or detachably mounted to an outside of the terminal body.

The rear case 102 can have a touch pad 135 mounted thereto additionally for sensing a touch thereto. Alike the display unit 151, the touch pad 135 can also be a light transmission type. In this case, if the display unit 151 is configured to provide visual information to both sides of the display unit 151, the visual information can be sensed through the touch pad 135. All information to be provided to the both sides can be controlled by the touch pad 135. Different from this, a display unit can be mounted to the touch pad 135 additionally, to arrange a touch screen on the rear case 102, too.

The touch pad 135 is operative in relation to the display unit 151 on the front case 101. The touch pad 135 can be arranged in rear of the display unit 151 in parallel thereto. The touch pad 135 can have a size the same or smaller than the display unit 151.

Moreover, a battery 190, which is a power supply unit, may be provided to a backside of the terminal body (i.e., main body). In particular, the battery 190 is loaded in the rear case 102 including the front part and the rear part. Moreover, a battery cover 200 configured to protect the battery 190 by preventing the battery 190 form being externally exposed and a battery cover locking device configured to fix the battery cover to the terminal body may be further installed at the rear case 102.

A mobile terminal according to one embodiment of the present invention may include a body including a rear case having a front part and a rear part, a battery received in the body, and a battery cover detachably provided between the front part and the rear part to protect the battery against external environment. And, the mobile terminal may further include a guide member fixed to an inner lateral side of one end portion of the battery cover, a moving member received in the guide member to be guided by the guide member to move back and forth, and a hooking member provided within the body, the hooking member including a hooking surface engaged with the moving member to fix the battery cover to the body.

In the following description, a battery cover 200 installed at a terminal body and a battery cover locking device 300 configured to fix the battery cover 200 to the terminal body are explained in detail.

Figure 3:
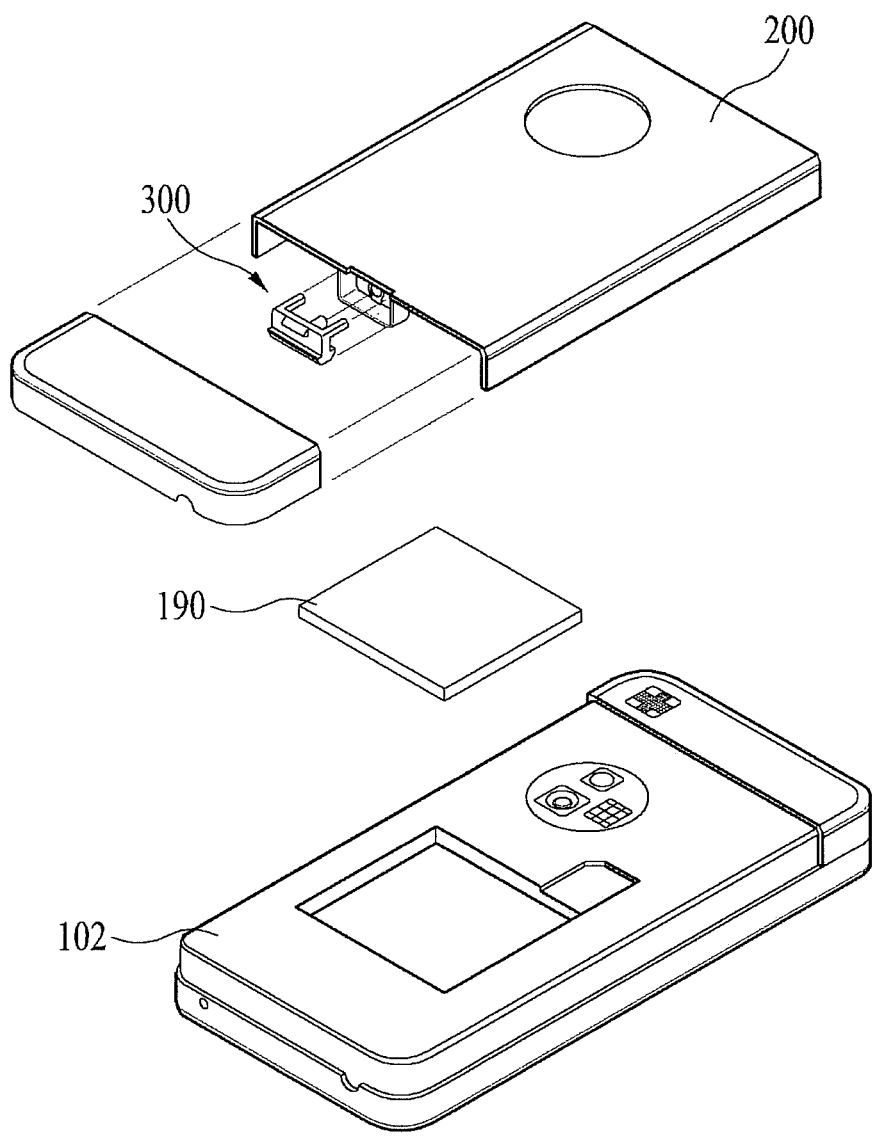
FIG. 3 is a schematic exploded perspective diagram of a mobile terminal according to a $1^{st}$ embodiment of the present invention.

FIG. 3 is a schematic exploded perspective diagram of a mobile terminal 100 according to a 1$^{st}$ embodiment of the present invention.

Referring to FIG. 3, a terminal body includes a battery cover 200 detachably installed at the terminal body to protect the battery 190 externally and a battery cover locking device 300 configured to fix the battery cover 200 to the terminal body.

In particular, the battery cover 200 includes at least one projection (not shown in the drawing) provided to one end portion of the battery cover 200 to be supported by being inserted in the body and the battery cover locking device 300 provided to the other end portion of the battery cover 200. In particular, the at least one projection may be configured to fix one end portion of the battery cover 200 to the terminal body and the battery cover locking device 300 may be configured to be engaged with a hooking member 330 provided to the terminal body in a manner that the at least one projection is inserted in the terminal body and then pushed downward. Thus, a user may be able to detach the battery cover 200 from the terminal body by canceling a locked state of the battery cover locking device 300.

Unlike the related art battery cover locking device, the battery cover locking device 300 according to the present invention may have the following advantages and/or advantages.

First of all, the battery cover locking device 300 according to the present invention has a simple configuration constructed with components less than those of the related art battery cover locking device, thereby reducing a manufacturing process time. Secondly, a configuration of the battery cover locking device 300 according to the present invention is barely exposed to an external environment, thereby enhancing the exterior beauty of the terminal body. Thirdly, the battery cover locking device 300 according to the present invention facilitates a user to detach the battery cover 200 from the terminal body using user's fingernail without using user's muscle.

In the following description, the battery cover locking device 300 according to the present invention is explained in detail with reference to the accompanying drawings.

Figure 4:
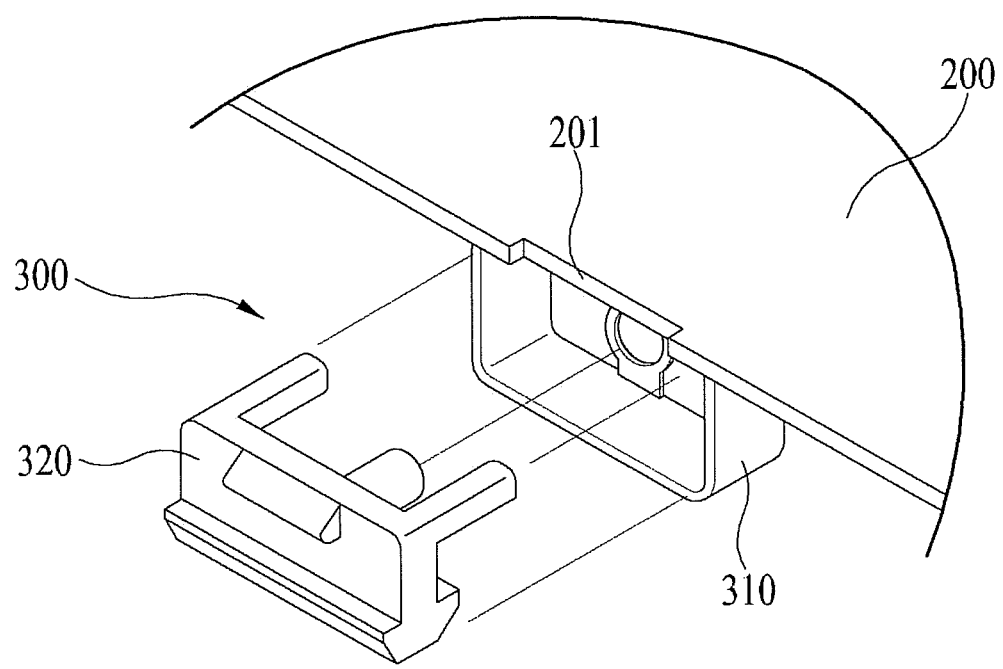
FIG. 4 is a schematic perspective diagram of a battery cover locking device according to the present invention.

FIG. 4 is a schematic perspective diagram of a battery cover locking device according to the present invention.

Referring to FIG. 4, a battery cover locking device 300 according to the present invention may include a guide member 310 fixedly installed at an inner surface of one end portion of a battery cover 200, a moving member 320 received in the guide member 310, and a hooking member 330 provided within a terminal body to fix the battery cover 200 to the terminal body.

As a configuration for unlocking the battery cover locking device 300, a slot 201 is provided to one end portion (i.e., one end portion to which the guide member 310 of the battery cover locking device 300 is provided) of the battery cover 200 detachably attached to the terminal body. In this case, a user's fingernail may be fitted into the slot 201.

The guide member 310 may restrict a forward/backward path of the moving member 320. In particular, the guide member 310 guides the moving member 320 to move in forward or backward direction. The guide member 310 may be built in one body of the battery cover 200 by casting or the like. Alternatively, the guide member 310 is separately formed and welded to the battery cover 200. Alternatively, the guide member 310 is separately formed and attached to the battery cover 200 with adhesive agent.

The moving member 320 moves forward/backward within the guide member 310 to fix/separate the battery cover 200 to/from the terminal body. In particular, if the moving member 320 moves forward to engage with the hooking member 330 installed within the terminal body, the battery cover 200 is fixed to the terminal body. On the other hand, if the moving member 320 moves backward to escape from the engagement with the hooking member 330, the battery cover 200 is separated from the terminal body. An operating mechanism of the battery cover locking device 300 shall be described in detail later.

The slot 201 provided to the battery cover 200 may be configured to have a size enough for a user's fingernail to be fitted therein. Preferably, a vertical length (i.e., length to an edge from an inside of the battery cover 200) of the slot 201 may be set to 0.5 mm ~2.5 mm.

And, the hooking member 330 includes a hooking sill 331 having a hooking surface 331b configured to contact and engage with the moving member 320.

Figure 5A:
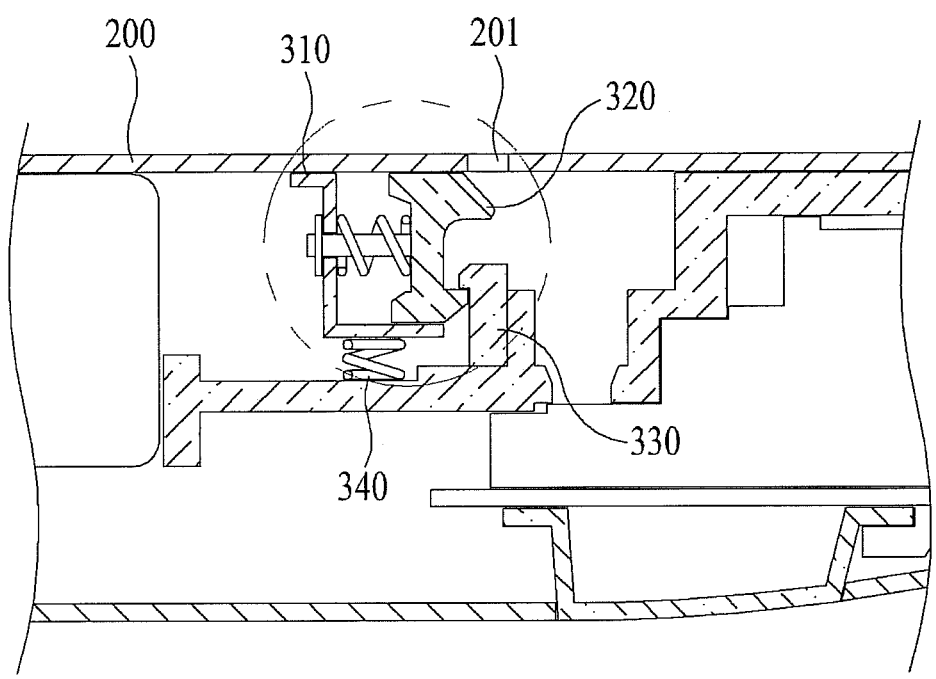
FIG. 5A is a schematic cross-sectional diagram of a battery cover locking device according to the present invention.

FIG. 5A is a schematic cross-sectional diagram of a battery cover locking device 300 according to the present invention. And, FIG. 5B is a schematically enlarged diagram of a portion of a battery cover locking device according to the present invention.

Figure 5B:
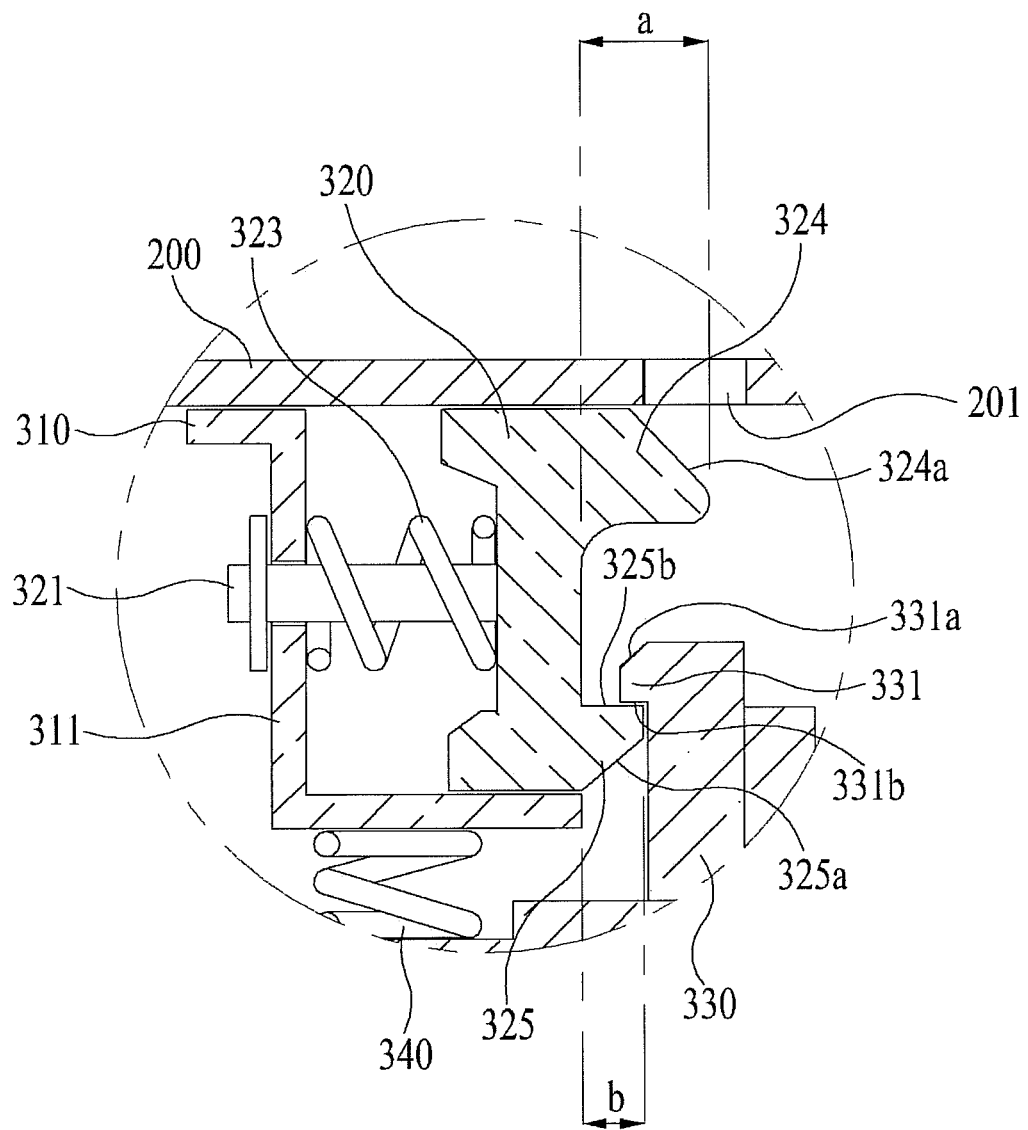
FIG. 5B is an schematically enlarged diagram of a portion of a battery cover locking device according to the present invention.

Referring to FIG. 5A and FIG. 5B, a guide member 310 may include a backside portion 311 configured to restrict a backward moving distance of the moving member 320, at least one guide opening provided to the backside portion 311 and a stop sill configured to restrict a forward moving distance of the moving member 320.

The backside portion 311 is a partition provided to a backside of the guide member 310 entirely or in part and prevents the moving member 320 from deviating from the guide member 310 in rear direction. The guide opening provided to the backside portion 311 may be configured to be penetrated by the guide projection 321 provided to the moving member 320. And, the backside portion 311 may also play a role in supporting an elastic member 323 that will be described later.

The stop sill (not shown in the drawing) is a projection partially provided to a front side of the guide member and prevents the moving member 320 from deviating from the guide member 310 in front direction.

Referring to FIG. 5A and FIG. 5B, the moving member 320 may include a hooking sill 325 having a hooking surface 325a configured to engage with a hooking surface 331b of a hooking member 330, a pushing sill provided in the vicinity of an inner surface of the battery cover 200 and at least one guide projection 321 configured to penetrate the guide opening provided to the guide member 310.

The push sill 324 includes a push surface 324a coming into contact with a user's fingernail. As the push surface 324a is formed toward the slot 201 provided to the battery cover 200, if a user fits his fingernail (e.g., a tip of a fingernail, a topside of a fingernail, etc.) into the slot 201, the push surface 324a can be pushed.

The push surface 324 may include an inclining plane. Preferably, an inclining angle of the inclining plane may be set to 45 to 75 degrees to facilitate a user to pressurize the push surface 324a.

Alternatively, the push surface 324 may include a convex plane configured to face the slot 201 of the battery cover 200. Since the push surface 324a is formed as the convex plane, the push surface 324a may be provided in the vicinity of the slot 201. Therefore, a user is facilitated to unlock the battery cover locking device 300 in a manner of pushing the push surface 324a without deeply fitting his fingernail into the slot 201.

The hooking sill 325 of the moving member 320 may include a hooking surface 325b configured to engage with the hooking member 330 and a sliding surface 325a extending from the hooking surface 325b. In particular, the hooking surface 325b is configured to have a straight line form in horizontal direction, while the sliding surface 325a includes an inclining or convex plane configured to face a bottom direction (i.e., a direction opposite to a direction of facing the battery cover 200 in the terminal body).

The hooking sill 331 of the hooking member 330 may include a hooking surface 331b configured to contact and engage with the hooking surface 325b of the moving member 320 and a sliding surface 331a extending from the hooking surface 331b. In particular, the hooking surface 331b is configured to have a straight line form in horizontal direction, while the sliding surface 331a includes an inclining or convex plane configured to face a top direction (i.e., a direction of facing the battery cover 200 in the terminal body). When a force is applied to the battery cover 200 in bottom direction to attach the battery cover 200 to the terminal body, the sliding surface 331a of the hooking member 330 comes into contact with the sliding surface 325a of the moving member 320 to facilitate the moving member 320 to move in rear direction.

Preferably, the push sill 324 of the moving member 320 may be configured in a manner that a length 'a' of the push sill 324 of the moving member 320 is set greater than a length 'b' of the hooking surface 325b of the moving member 320 [cf. FIG. 5B]. As the length of the push sill 324 of the moving member 320 is formed greater than that of the hooking surface 325b of the moving member 320, a user is facilitated to disengage the hooking sill 325 of the moving member 320 and the hooking sill 331 of the hooking member 330 from each other without deeply fitting user's fingernail into the slot 201 provided to the battery cover 200.

Between the moving member 320 and the backside portion 311 of the guide member 310, an elastic member 323 is provided to be penetrated by the guide projection 321 of the moving member 320. In particular, when the moving member 320 moves backward within the guide member 310, the elastic member 323 applies an elastic restoring force to the moving member 320 to move in front direction.

Preferably, another elastic member 340 may be provided in bottom direction of the guide member 310 within the terminal body to apply an elastic restoring force to a bottom side of the guide member 310. In particular, when a locked state of the battery cover locking device 300 is cancelled (i.e., the hooking sill 325 of the moving member 320 and the hooking sill 331 of the hooking member 330 are disengaged from each other), the elastic member 340 is able to raise the battery cover 200 in top direction through the bottom side of the guide member 310 with the elastic restoring force of the elastic member 340, thereby facilitating the battery cover 200 to be detached from the terminal body.

Figure 6A:
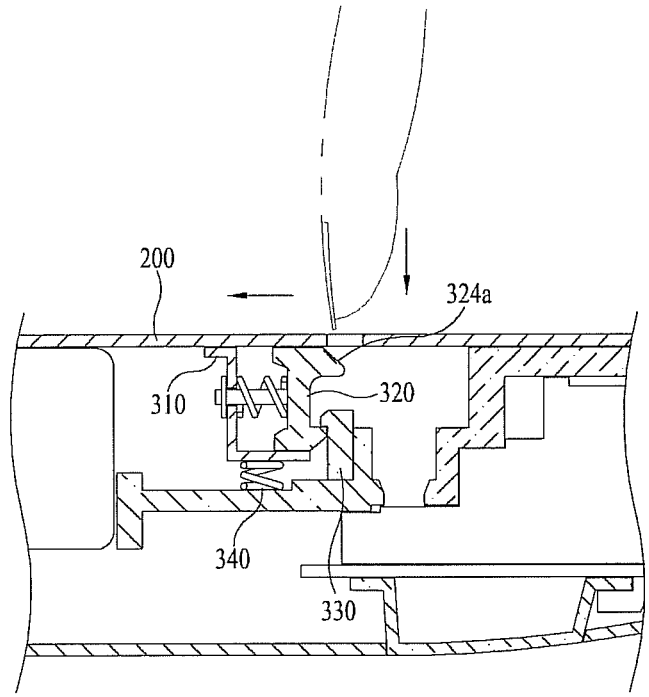
FIG. 6A and FIG. 6B are schematic cross-sectional diagrams to describe an operating mechanism of a battery cover locking device according to the present invention.
Figure 6B:
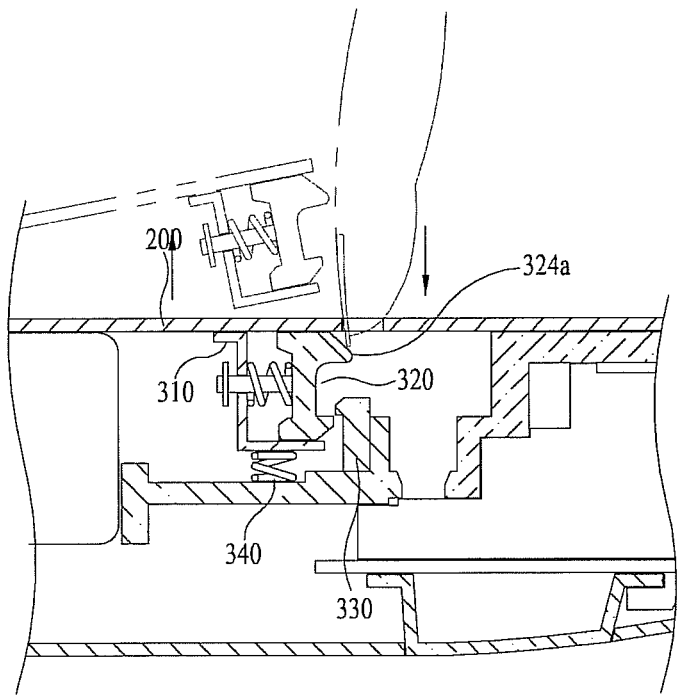

FIG. 6A and FIG. 6B are schematic cross-sectional diagrams to describe an operating mechanism of the battery cover locking device 300 according to the present invention.

Referring to FIG. 6A, while the battery cover locking device 300 is in a locked state, the hooking sill 325 (i.e., the hooking surface 325b) of the moving member 320 and the hooking sill 331 (i.e., the hooking surface 331b) of the hooking member 330 are engaged with each other. Hence the battery cover 200 can be fixedly attached to the terminal body. In doing so, if a user fits his fingernail into the slot 201 provided to the battery cover 200, the fitted fingernail pressurizes the push surface 324a of the moving member 320. As the push surface 324a is provided as the convex plane or the inclining plane, the pressurization applied to the push surface 324a enables the moving member 320 to move in rear direction within the guide member 310.

Referring to FIG. 6B, once the moving member 320 moves in rear direction within the guide member 310, the hooking sill 325, which has a length smaller than that of the push sill 324 of the moving member 320, of the moving member 320 is disengaged from the hooking sill 331 of the hooking member 330. In doing so, the elastic member 340 provided under the guide member 310 within the terminal body applies the elastic restoring force to the bottom side of the guide member 310, thereby raising the guide member 310 and the battery cover 200 in top direction by a prescribed distance.

Considering a process (not shown in the drawing) for attaching the battery cover 200 to the terminal body, after the battery cover 200 has been placed on the backside of the terminal body, at least one projection (not shown in the drawing) provided to one end portion of the battery cover 200 is inserted in the terminal body. Subsequently, if a peripheral region of the slot 201 provided to the other end portion of the battery cover 200 is pressed downward, the battery cover 200 can be fixedly installed at the terminal body. In particular, if a user presses the peripheral region of the slot 201 of the battery cover 200, the sliding surface 325a provided to the hooking sill 325 of the moving member 320 comes into contact with the sliding surface 331a provided to the hooking sill 331 of the hooking member 330 and the moving member 320 then moves in rear direction within the guide member 310 owing to a repulsive force attributed to the hooking sill 331 of the hooking member 330. Subsequently, as the moving member 320 moves farther in bottom direction to end the contact between the sliding surface of the moving member 320 and the sliding surface of the hooking member 330, the moving member 320 moves forward toward the hooking member 330 owing to the elastic restoring force of the elastic member 323 provided to the guide projection 321 of the moving member 320 to engage the hooking surface provided to the hooking sill of the moving member 320 with the hooking surface provided to the hooking sill of the hooking member 300. Therefore, the battery cover 200 can be fixed to the terminal body.

As mentioned in the foregoing description, the mobile terminal 100 according to the present invention includes the battery cover locking device 300 having the above-described simple configuration, thereby reducing manufacturing costs. The mobile terminal 100 according to the present invention configures the battery cover locking device 300 to be unlocked via the slot 201 without exposing the battery cover locking device 300 externally, thereby enhancing the exterior beauty of the mobile terminal 100. Moreover, a user is able to unlock the battery cover locking device 300 in a manner of fitting a fingernail into the slot 201 provided to the battery cover 200, thereby facilitating the battery cover 200 to be detached from the mobile terminal 100.

Figure 7:
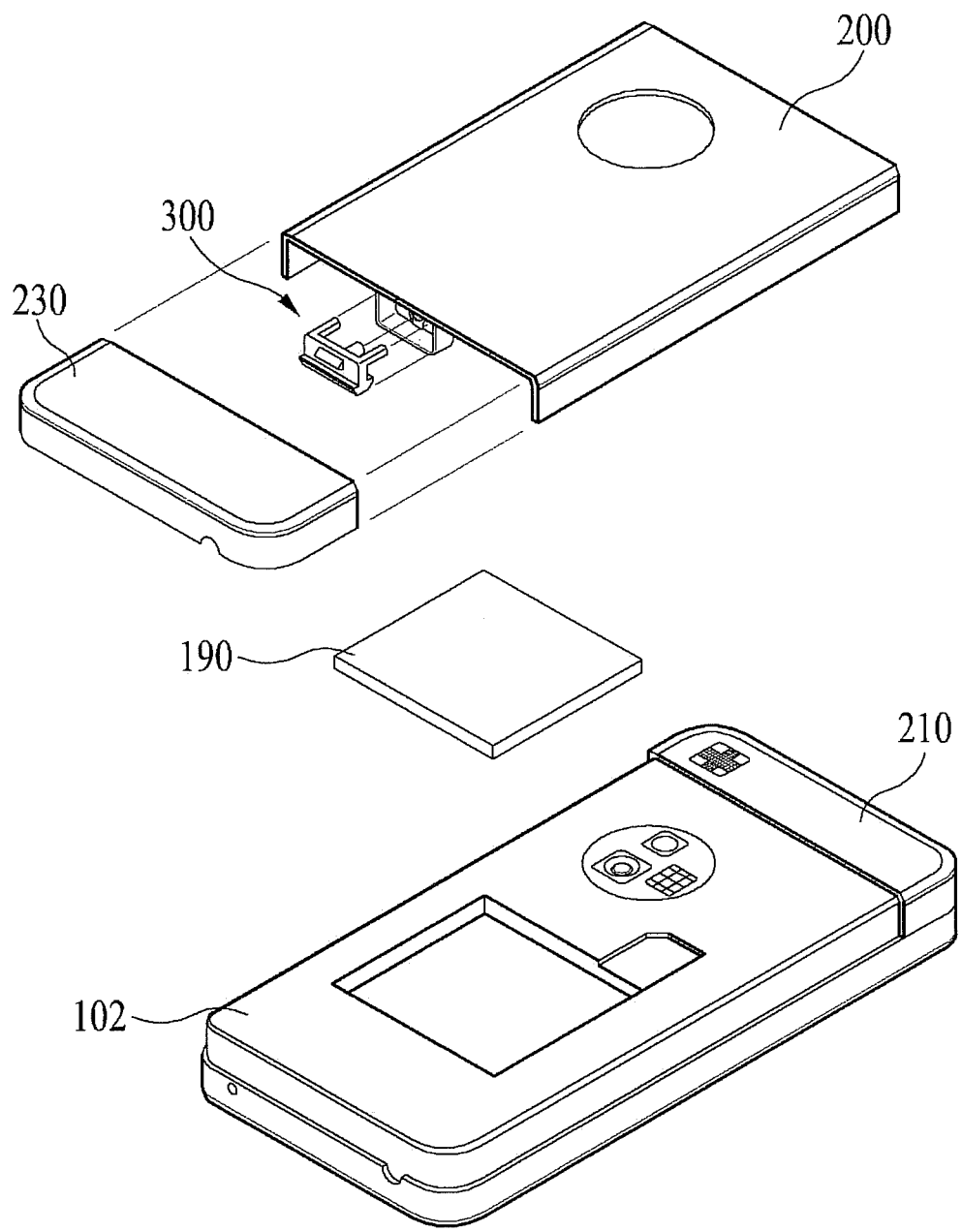
FIG. 7 is a schematic exploded diagram of a mobile terminal according to a $2^{nd}$ embodiment of the present invention.

FIG. 7 is a schematic exploded diagram of a mobile terminal according to a $2^{nd}$ embodiment of the present invention.

Referring to FIG. 7, a terminal body includes a battery cover 200 detachably installed at the terminal body to protect the battery 190 externally and a battery cover locking device 300 configured to fix the battery cover 200 to the terminal body.

In particular, the battery cover 200 includes at least one projection (not shown in the drawing) provided to one end portion of the battery cover 200 to be supported by being inserted in the body and the battery cover locking device 300 provided to the other end portion of the battery cover 200. In particular, the at least one projection may be configured to fix one end portion of the battery cover 200 to the terminal body and the battery cover locking device 300 may be configured to be engaged with a hooking member 330 provided to a rear part 230 of the terminal body in a manner that the at least one projection is inserted in the terminal body and then pushed downward.

According to a second embodiment of the present invention, the battery cover 200 may be facilitated to be detached from the terminal body in a manner that a user cancels a locked state of the battery cover locking device 300 by pressing one end portion of the rear case in vertical direction. A configuration of locking the battery cover locking device 300 by pushing the battery cover 200 and a configuration of unlocking the battery cover locking device 300 by pushing the locked battery cover 200 again will be described in detail with reference to the accompanying drawings.

Unlike the related art battery cover locking device, the battery cover locking device 300 according to the present invention may have the following advantages and/or advantages.

First of all, the battery cover locking device 300 according to the present invention has a simple configuration constructed with components less than those of the related art battery cover locking device, thereby reducing a manufacturing process time. Secondly, a configuration of the battery cover locking device 300 according to the present invention is barely exposed to an external environment, thereby enhancing the exterior beauty of the terminal body. Thirdly, the battery cover locking device 300 according to the present invention facilitates a user to detach the battery cover 200 from the terminal body in a manner of pushing one end portion of the rear part 230 of the rear case toward an inside of the terminal body without using user's muscle.

Figure 8:
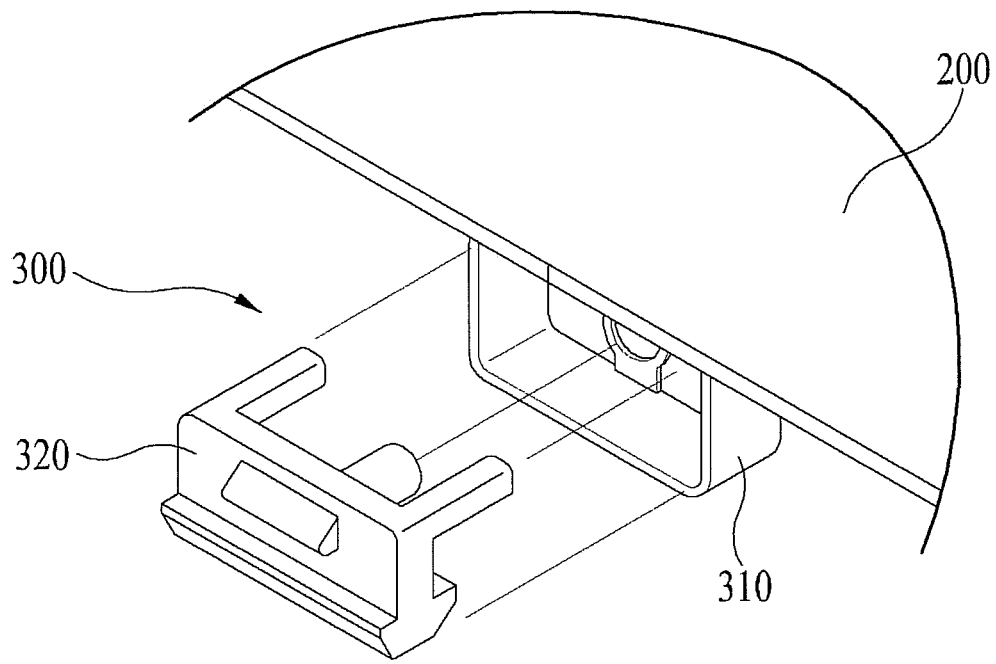
FIG. 8 is a schematic perspective diagram of a battery cover locking device according to a $2^{nd}$ embodiment of the present invention.

FIG. 8 is a schematic perspective diagram of a battery cover locking device 300 according to a $2^{nd}$ embodiment of the present invention.

Referring to FIG. 8, a battery cover locking device 300 according to the present invention may include a guide member 310 fixedly installed at an inner surface of one end portion of a battery cover 200, a moving member 320 received in the guide member 310, and a hooking member 330 provided within a terminal body to fix the battery cover 200 to the terminal body.

The guide member 310 may restrict a forward/backward path of the moving member 320. In particular, the guide member 310 guides the moving member 320 to move in forward or backward direction. The guide member 310 may be built in one body of the battery cover 200 by casting or the like. Alternatively, the guide member 310 is separately formed and welded to the battery cover 200. Alternatively, the guide member 310 is separately formed and attached to the battery cover 200 with adhesive agent.

The moving member 320 moves forward/backward within the guide member 310 to fix/separate the battery cover 200 to/from the terminal body. In particular, if the moving member 320 moves backward to engage with the hooking member 330 installed within the terminal body, the battery cover 200 is fixed to the terminal body. On the other hand, if the moving member 320 moves forward to escape from the engagement with the hooking member 330, the battery cover 200 is separated from the terminal body. An operating mechanism of the battery cover locking device 300 shall be described in detail later.

And, the hooking member 330 includes a hooking surface 333a configured to contact and engage with the moving member 320.

Figure 9A:
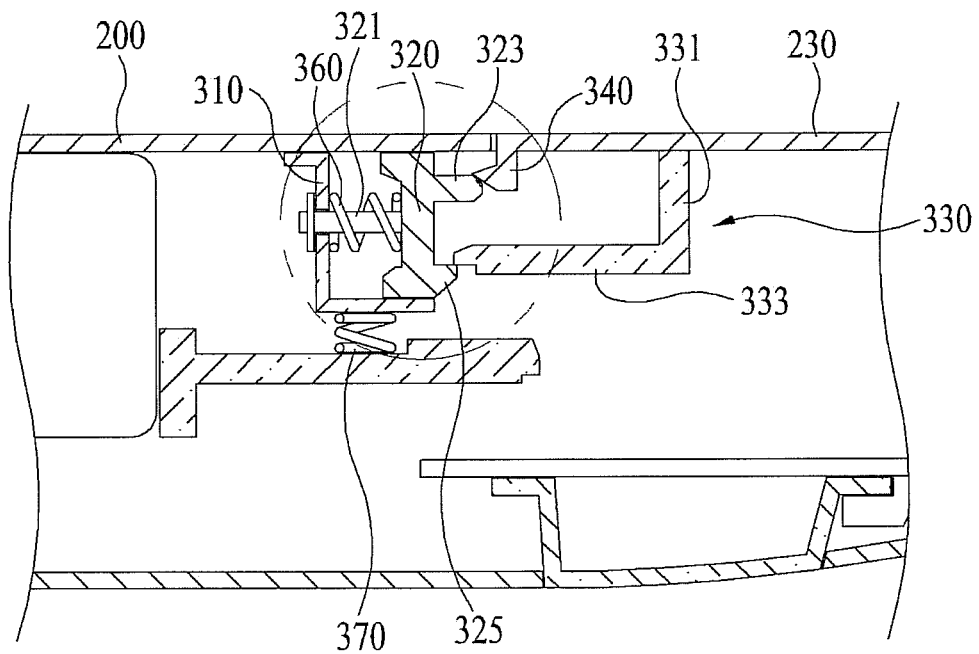
FIG. 9A is a schematic cross-sectional diagram of a battery cover locking device according to a $2^{nd}$ embodiment of the present invention.

FIG. 9A is a schematic cross-sectional diagram of a battery cover locking device 300 according to a $2^{nd}$ embodiment of the present invention. And, FIG. 9B is a schematically enlarged diagram of a portion of the battery cover locking device 300 according to the $2^{nd}$ embodiment of the present invention.

Figure 9B:
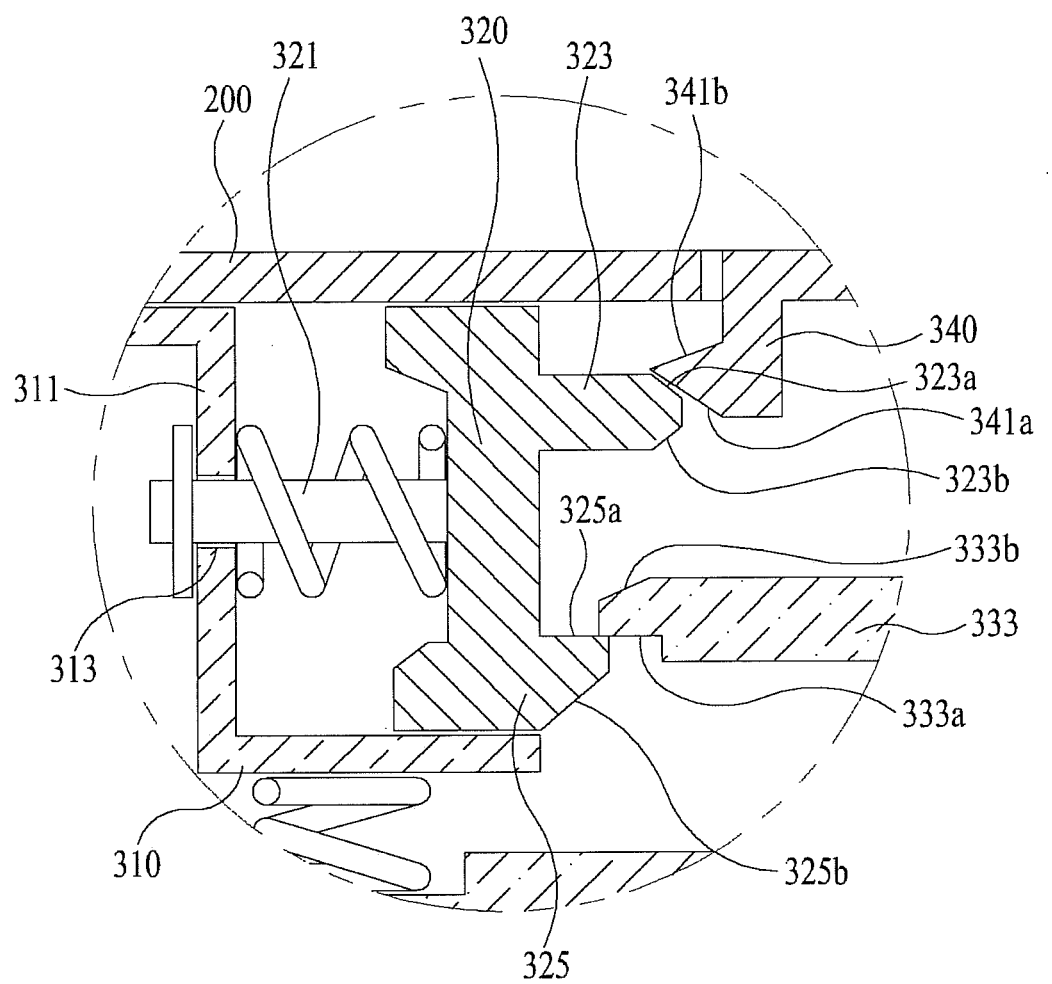
FIG. 9B is an schematically enlarged diagram of a portion of a battery cover locking device according to a $2^{nd}$ embodiment of the present invention.

Referring to FIG. 9A and FIG. 9B, a guide member 310 may include a backside portion 311 configured to restrict a forward moving distance of the moving member 320, at least one guide opening provided to the backside portion 311 and a stop sill (not shown in the drawing) configured to restrict a backward moving distance of the moving member 320.

The backside portion 311 is a partition provided to a backside of the guide member 310 entirely or in part and prevents the moving member 320 from deviating from the guide member 310 in front direction. The guide opening 313 provided to the backside portion 311 may be configured to be penetrated by the guide projection 321 provided to the moving member 320, which will be described later. And, the backside portion 311 may also play a role in supporting an elastic member 360 that will be described later.

The stop sill (not shown in the drawing) is a projection partially provided in rear direction of the guide member 310 and prevents the moving member 320 from deviating from the guide member 310 in rear direction.

Referring to FIG. 9A and FIG. 9B, an unlocking member 340 having a pressurizing projection 341 configured to deliver a pressurizing force working in bottom direction from one end portion of the rear part 230 and a hooking member 330 having a hooking surface 333a engaging with the moving member 320 may be included in an inner surface of the rear part 230 of the rear case.

The unlocking member 340 is provided in vertical direction to an inner surface of one end portion situated in front direction of the rear part 230 and includes the pressurizing projection 341 configured to be projected in front direction.

A height of the pressurizing projection 341 corresponds to a height of a $1^{st}$ projecting portion 323. In particular, the pressurizing projection 341 is formed at a position that enables a bottom surface of the pressurizing projection 341 to come into contact with a top surface 323a of the $1^{st}$ projecting portion 323 when the battery cover 200 is fixed to the terminal body.

The top surface 341b and the bottom surface 341a of the pressurizing projection 341 may include either an inclining surface or a convex surface. In particular, in order to facilitate a backward movement of the moving member 320, the bottom surface of the pressurizing projection 341 preferably includes the convex surface.

The hooking member 330 is configured to have 'L' shape and is situated at the inner surface of one end portion situated in front direction of the rear part 230 in a manner of being spaced apart by a prescribe distance from the unlocking member 340. In particular, the hooking member 330 includes a vertical portion 333 provided in vertical direction to a position spaced apart from the unlocking member 340 by a prescribed distance in rear direction and a horizontal portion 331 provided in horizontal direction to the vertical portion 333. And, a hooking surface 333a formed in horizontal direction is provided to an end portion of the horizontal portion 331 to engage with the moving member 320 (i.e., a hooking surface 325a of a $2^{nd}$ projecting portion 325 of the moving member 320 that will be described later). Moreover, a sliding surface 333b is provided to the end portion of the horizontal portion 331 to form a top surface of the end portion of the horizontal portion 331 by extending from the hooking surface 333a. In this case, the sliding surface 333b may include an inclining or convex surface to facilitate the sliding motion of a sliding surface 325b of the $2^{nd}$ projecting portion 325.

As the unlocking member 340 and the hooking member 330 are provided to the inner surface of the rear part 230 in a manner of being spaced apart from each other by a prescribed distance, one end portion of the rear part 230 having the unlocking member 340 may reciprocate elastically in prescribed height. Since one end portion of the rear part 230 is able to reciprocate in the prescribed height, the unlocking member 340 is able to reciprocate up and down. This up-and-down motion of the unlocking member 340 enables the $1^{st}$ projecting portion 323 of the moving member 320 in front direction, thereby facilitating the battery cover locking device 300 to be unlocked.

Referring to FIG. 9A and FIG. 9B, the moving member 320 includes a $1^{st}$ projecting portion 323 provided to an upper portion of the moving member 320 in rear direction to receive a pressurizing force from the pressurizing projection 341 and a $2^{nd}$ projecting portion 325 provided to a lower portion of the moving member 320 in rear direction, the $2^{nd}$ projecting portion 325 having a hooking surface 325a to engage with the hooking surface 333a of the hooking member 330.

The $1^{st}$ projecting portion 323 includes a pressurized surface 323a receiving a pressurizing force from a bottom surface of the pressurizing projection 341 in case of moving one end portion of the rear part 230 into the terminal body in vertical direction and a sliding surface 323b extending from the pressurized surface 323a to have a top surface 341b of the pressurizing projection 341 to slide thereon.

The pressurized surface 323a forms the top surface 323a of the $1^{st}$ projecting portion 323 and includes either an inclining surface or a convex surface. The sliding surface 323b forms the bottom surface of the $1^{st}$ projecting portion 323 and includes either an inclining surface or a convex surface.

Preferably, if each of the pressurized surface 323a and the sliding surface 323b includes he inclining surface, the pressurized surface 323 may have an inclining angle set greater than that of the sliding surface 323b. Thus, if the pressurizing projection 341 of the unlocking member 340 pressurizes the $1^{st}$ projecting portion 323 of the moving member 320, the moving member 320 is facilitated to move in front direction. If the battery cover 200 is pushed toward the terminal body in order to fix the battery cover 200 to the terminal body, the moving member 320 can be smoothly moved in front direction.

The $2^{nd}$ projecting portion 325 includes a hooking surface 325a configured to form a top surface of the $2^{nd}$ projecting portion 325 by being formed in horizontal direction to engage with the hooking surface 333a of the hooking member 330 and a sliding surface 325b extending from the hooking surface 325a to form a bottom surface of the $2^{nd}$ projecting portion 325. In particular, if the battery cover 200 is pushed toward the terminal body to fix the battery cover 200 to the terminal body, the sliding surface 325b comes in contact with the sliding surface 333b to enable the moving member 320 to move in front direction.

Preferably, each of the sliding surfaces 325b and 333b includes an inclining surface or a convex surface.

The moving member 320 may include at least one guide projection 321 configured to penetrate the guide opening provided to the guide member 310.

Between the moving member 320 and the backside portion 311 of the guide member 310, an elastic member 360 is provided to be penetrated by the guide projection 321 of the moving member 320. In particular, when the moving member 320 moves in front direction within the guide member 310, the elastic member 323 applies an elastic restoring force to the moving member 320 to move in rear direction.

Preferably, another elastic member 370 may be provided in bottom direction of the guide member 310 within the terminal body to apply an elastic restoring force to a bottom side of the guide member 310. In particular, when a locked state of the battery cover locking device 300 is cancelled (i.e., the hooking surface 325a of the $2^{nd}$ projecting portion 325 of the moving member 320 and the hooking surface 333a of the hooking member 330 are disengaged from each other), the elastic member 370 is able to raise the battery cover 200 in top direction through the bottom side of the guide member 310 with the elastic restoring force of the elastic member 340, thereby facilitating the battery cover 200 to be detached from the terminal body.

Figure 10A:
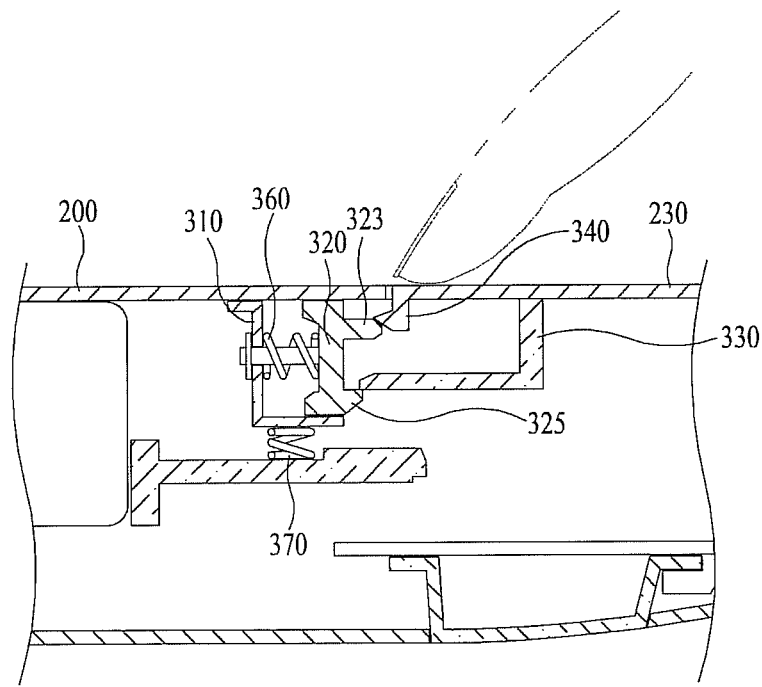
FIG. 10A and FIG. 10B are schematic cross-sectional diagrams to describe an operating mechanism of a battery cover locking device according to the present invention.
Figure 10B:
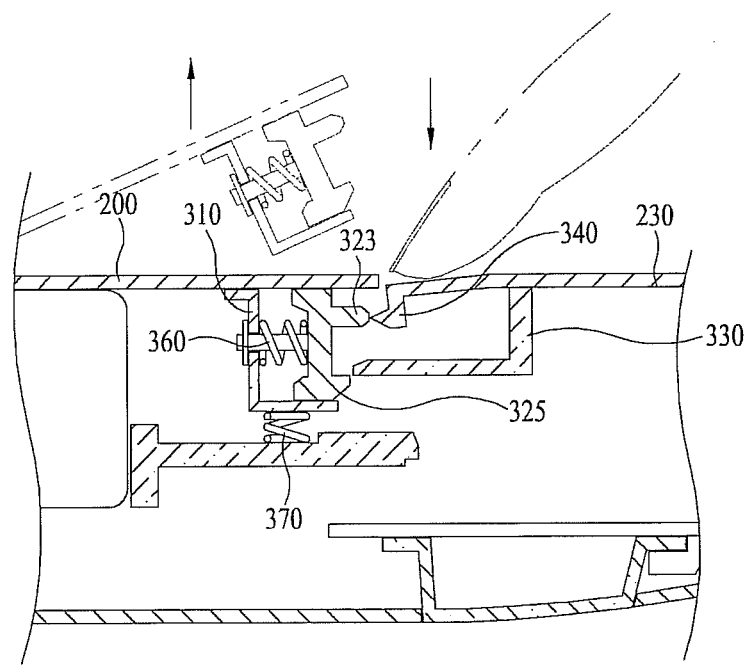

FIG. 10A and FIG. 10B are schematic cross-sectional diagrams to describe an operating mechanism of the battery cover locking device 300 according to the $2^{nd}$ embodiment of the present invention.

Referring to FIG. 10A, while the battery cover locking device 300 is in a locked state, the $2^{nd}$ projecting portion 325 (i.e., the hooking surface 325b) of the moving member 320 and the end portion 331 (i.e., the hooking surface 333a) of the hooking member 330 are engaged with each other. Hence, the battery cover 200 can be fixedly attached to the terminal body.

A process for fixing the battery cover 200 to the terminal body is explained in detail as follows. First of all, after a projection (not shown in the drawing) provided to one end portion of the battery cover 200 has been inserted in the front part of the rear case, if a force is applied downward to the other end portion of the battery cover 200, the sliding surface 325b of the $2^{nd}$ projecting portion 325 of the moving member 320 receives a repulsive force from the top surface 341b of the pressurizing projection 341 of the unlocking member 340 o move the moving member 320 in front direction. Subsequently, as the sliding surface 325b of the 2nd projecting portion 325 comes in contact with the sliding surface 333b of the hooking member 330 and then receives a supporting repulsive force from the sliding surface 333b, the moving member 320 is moved in front direction. Thereafter, the moving member 320 is moved in rear direction by the elastic restoring force of the elastic member 360 provided between the backside portion of the guide member 310 and the backside of the moving member 320 and the hooking surface 325a of the $2^{nd}$ projecting portion 325 is then engaged with the hooking surface 333a of the hooking member 330. Therefore, the battery cover 200 is fixed to the terminal body. In doing so, the pressurized surface of the $1^{st}$ projecting portion 323 (barely) comes in contact with the bottom surface of the pressurizing projection 341.

Referring to FIG. 10B, if a user applies a force in vertical bottom direction to one end portion of the rear part 230 of the rear case, the one end portion of the rear part 230 is moved by a prescribed height in the vertical bottom direction to move the unlocking member 340 provided to the inner surface of the one end portion of the rear part 230 in the vertical bottom direction, whereby the pressurizing projection 341 of the unlocking member 340 delivers a pressurizing force to the pressurized surface 323a of the $1^{st}$ projecting portion 323 of the moving member 320. Therefore, the moving member 320 is moved in front direction. As a result, the hooking surface 325a of the $2^{nd}$ projecting portion 325 is disengaged from the hooking surface 333a of the hooking member 330, thereby the battery cover 200 is easily detached from the terminal body by the elastic restoring force of the elastic member provided between the terminal body and the bottom side of the guide member 310.

As mentioned in the foregoing description, the mobile terminal 100 according to the present invention includes the battery cover locking device 300 having the above-described simple configuration, thereby reducing manufacturing costs. The mobile terminal 100 according to the present invention configures the battery cover locking device 300 to be unlocked by applying a pressurizing force in vertical bottom direction to one end portion of the rear part 230 of the rear case without exposing the battery cover locking device 300 externally, thereby enhancing the exterior beauty of the mobile terminal 100. Moreover, the battery cover 200 can be detached from the mobile terminal 100 easily and conveniently.

Figure 11:
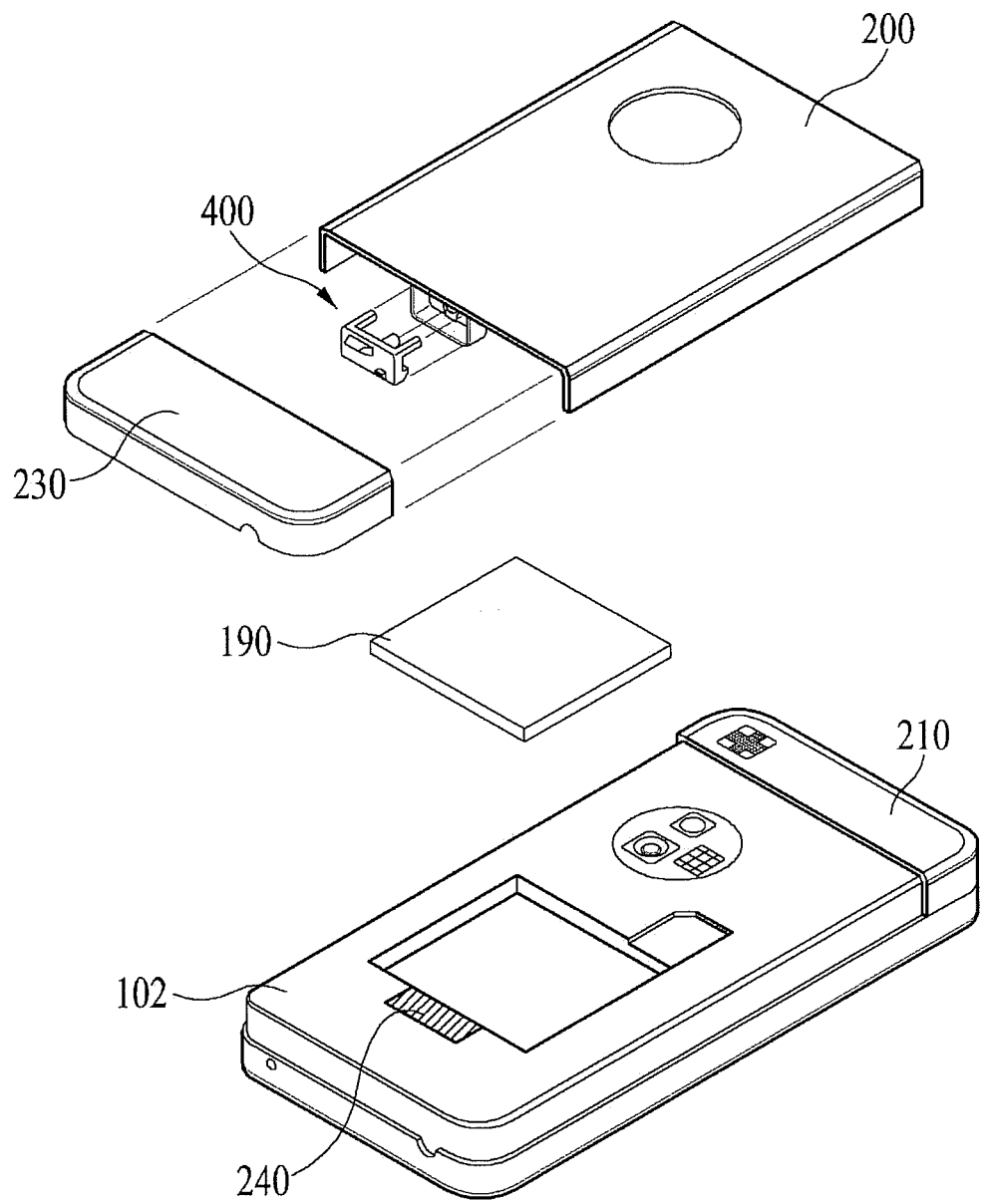
FIG. 11 is a schematic exploded diagram of a mobile terminal according to a 3$^{rd}$ embodiment of the present invention.

FIG. 11 is a schematic exploded diagram of a mobile terminal according to a $3^{rd}$ embodiment of the present invention.

Referring to FIG. 11, a terminal body includes a battery cover 200 detachably attached to the terminal body to protect the battery 190 externally and a battery cover locking device 400 configured to fix the battery cover 200 to the terminal body.

The battery cover 200 includes at least one projection (not shown in the drawing) provided to one end portion of the battery cover 200 to be supported by being inserted in the terminal body and a battery cover locking device 400 provided to the other end portion of the battery cover. The at least one projection fixes the one end portion of the battery cover 200 to the front part of the terminal body. And, the battery cover locking device 400 is configured to enable the at least one projection to be engaged with a hooking member 243 provided to the terminal body situated under the rear part of the rear case if pressed downward after being inserted in the terminal body.

According to a $3^{rd}$ embodiment of the present invention, if a user pushes one side of the rear case toward an inside of the terminal body, a locked state of the battery cover locking device 400 is cancelled to facilitate the battery cover 200 to be detached from the terminal body. A configuration of locking the battery cover locking device 400 by pushing one end portion of the battery cover 200 and a configuration of unlocking the battery cover locking device 400 by pushing one lateral side of the locked battery cover 200 again will be described in detail with reference to the accompanying drawings.

Unlike the related art battery cover locking device, the battery cover locking device 400 according to the present invention may have the following advantages and/or advantages.

First of all, the battery cover locking device 400 according to the present invention has a simple configuration constructed with components less than those of the related art battery cover locking device, thereby reducing a manufacturing process time. Secondly, a configuration of the battery cover locking device 400 according to the present invention is not exposed to an external environment at all, thereby enhancing the exterior beauty of the terminal body. Thirdly, the battery cover locking device 400 according to the present invention facilitates a user to detach the battery cover 200 from the terminal body in a manner of applying a force to one lateral side of the battery cover 200 toward an inside of the terminal body without using user's muscle.

Figure 12:
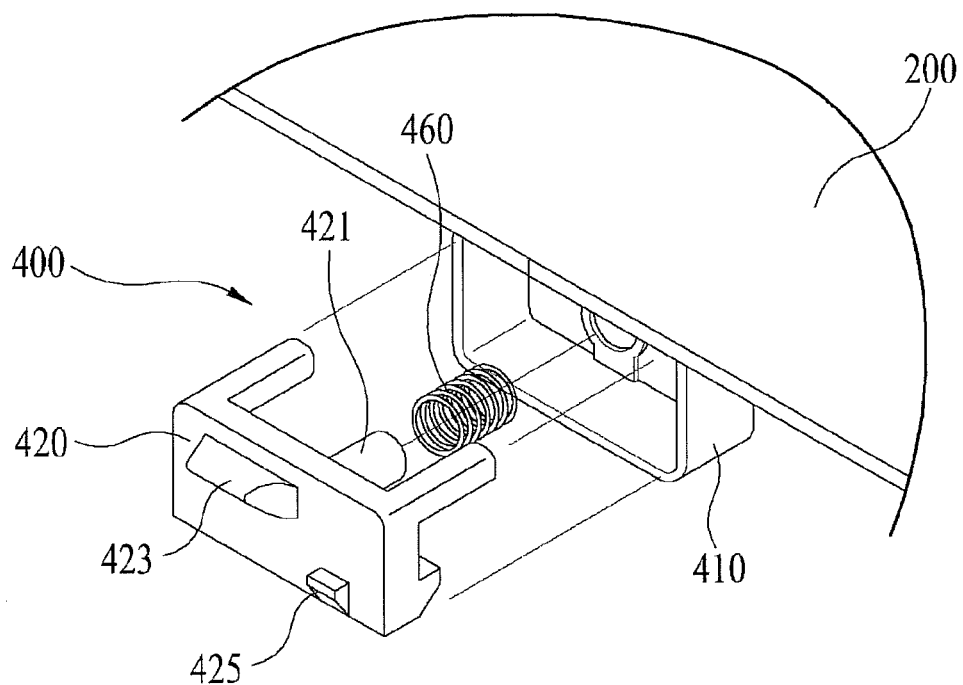
FIG. 12 is a schematic perspective diagram of a battery cover locking device according to a 3$^{rd}$ embodiment of the present invention.

FIG. 12 is a schematic perspective diagram of a battery cover locking device 400 according to a $3^{rd}$ embodiment of the present invention.

Referring to FIG. 12, a battery cover locking device 400 according to the present invention may include a guide member 410 fixedly installed at an inner surface of one end portion of a battery cover 200, a moving member 420 received in the guide member 410, and a hooking member 430 provided within a terminal body (or to a terminal body rear part 240) to fix the battery cover 200 to the terminal body.

The guide member 410 may restrict a forward/backward path of the moving member 420. In particular, the guide member 410 guides the moving member 420 to move in forward or backward direction. The guide member 410 may be built in one body of the battery cover 200 by casting or the like. Alternatively, the guide member 410 is separately formed and welded to the battery cover 200. Alternatively, the guide member 310 is separately formed and attached to the battery cover 200 with adhesive agent.

The guide member 410 may include a backside portion 411 configured to restrict a forward moving distance of the moving member 420, at least one guide opening provided to the backside portion 411 and a stop sill configured to restrict a backward moving distance of the moving member 420.

The backside portion 411 is a partition provided to a backside portion 411 of the guide member 410 entirely or in part and prevents the moving member 420 from deviating from the guide member 410 in front direction. The guide opening provided to the backside portion 411 may be configured to be penetrated by a guide projection 421 provided to the moving member 420, which will be described later. And, the backside portion 411 may also play a role in supporting an elastic member 460 that will be described later.

The stop sill (not shown in the drawing) is a projection partially provided to a rear side of the guide member 410 and prevents the moving member 420 from deviating from the guide member 410 in rear direction.

The moving member 420 moves in rear/front direction within the guide member 410 to fix/detach the battery cover 200 to/from the terminal body. In particular, if the moving member 420 moves in rear direction to be engaged with the hooking member 243 installed within the terminal body, the battery cover 200 is fixed to the terminal body. If the moving member 420 moves in front direction to be disengaged from the hooking member 243, the battery cover 200 can be detached or separate from the terminal body. A moving member 420 according to a $3^{rd}$ embodiment of the present invention includes a $1^{st}$ projecting portion 423 configured to cancel a locked state between a battery cover 200 and a terminal body and a $2^{nd}$ projecting portion 425 configured to fix the battery cover 200 to the terminal body. Detailed structures and shapes of the $1^{st}$ and $2^{nd}$ projecting portions 423 and 425 and an operating mechanism of the battery cover locking device 400 shall be described in detail later.

The moving member 420 may include at least one guide projection 421 configured to penetrate a guide opening provided to the guide member 410.

An elastic member 460 is provided between the moving member 420 and the backside portion 411 of the guide member 410 to be penetrated by the guide projection 421 of the moving member 420. In case that the moving member 420 moves in front direction within the guide member 410, the elastic member 460 applies an elastic restoring force to the moving member 420 to move the moving member 420 in rear direction.

And, the hooking member 243 includes a hooking surface 243c configured to contact and engage with the moving member 420.

Figure 13:
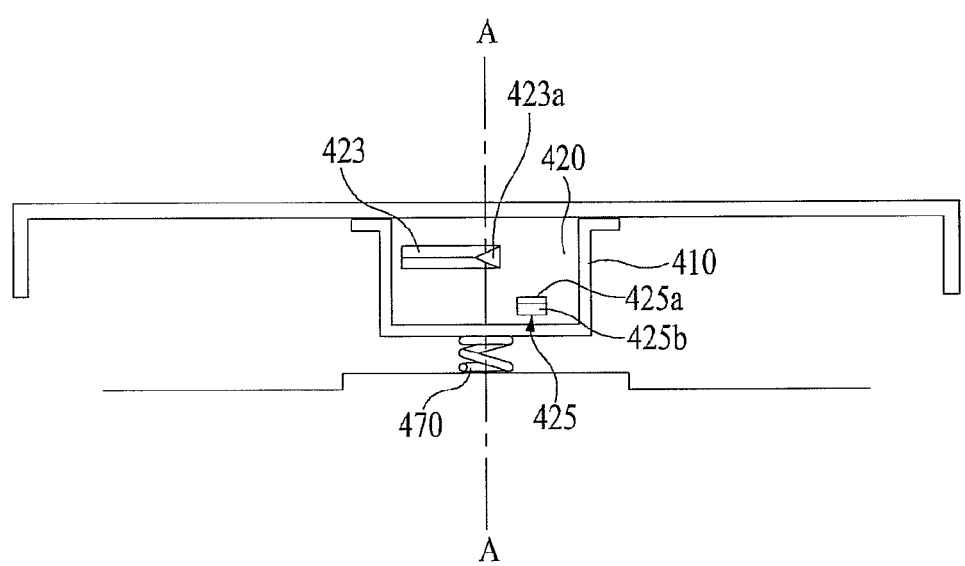
FIG. 13 is a schematic front view diagram of a battery cover and a battery cover locking device according to a 3$^{rd}$ embodiment of the present invention in view of rear-to-front direction.

FIG. 13 is a schematic front view diagram of a battery cover 200 and a battery cover locking device 400 according to a $3^{rd}$ embodiment of the present invention in view of rear-to-front direction.

Referring to FIG. 13, a moving member 420 may include a $1^{st}$ projecting portion 423 moving the moving member in front direction by delivering a pressurizing force working in lateral direction of a battery cover 200 to the moving member 420 and a $2^{nd}$ projecting portion 425 having a hiking surface 425a engaged with a hooking surface 243c of a hooking member 243.

The $1^{st}$ projecting portion 423 may be formed at one surface of the moving member 420 in a manner that a vertical center of the $1^{st}$ projecting portion 423 is situated eccentric in one direction from a vertical center of the moving member 420.

The $1^{st}$ projecting portion 423 includes a chamfer 423a provided to one lateral side closer to the vertical center of the moving member 420 among lateral sides of the $1^{st}$ projecting portion 423. Preferably, the chamfer 423a is an inclining surface or a convex surface. If a pressurizing force is applied in a lateral direction of the battery cover 200, the chamfer 423a plays a role in moving the moving member 420 in front direction in a manner of coming in contact with one surface of an unlocking member 241, which will be described later, and then receiving a repulsive force against the pressurizing force from the contacted surface of the unlocking member 241.

The $2^{nd}$ projecting portion 425 may include a hooking surface 425a configured to engage with a hooking surface 243c of the hooking member 243 and a sliding surface 425b extending from the hooking surface 425a. In this case, the hooking surface 425a is a top surface of the $2^{nd}$ projecting portion 425 and the sliding surface 425b is a bottom surface of the $2^{nd}$ projecting portion 425. Preferably, the hooking surface 425a is formed in horizontal direction and the sliding surface 425b is one of an inclining surface and a convex surface. The $2^{nd}$ projecting portion 425 is formed at one surface of the moving member 420 in a manner of being spaced apart from one lateral side closer to the vertical center of the moving member 420 among both lateral sides of the $1^{st}$ projecting portion 423 by a prescribed distance. Preferably, the prescribed distance may be similar or equal to a width of the unlocking member 241 described later. In particular, in case that the battery cover 200 is fixed to the terminal body, the unlocking member 241 described later is situated in a space amounting to the prescribed distance between the $1^{st}$ projecting portion 423 and the $2^{nd}$ projecting portion 425.

Preferably, an elastic member 470 may be provided under the guide member 410 within the terminal body to apply an elastic restoring force to the bottom surface of the guide member 410. In particular, when a locked state of the battery cover locking device 400 is cancelled (i.e., the hooking surface 425a of the $2^{nd}$ projecting portion 425 of the moving member 420 and the hooking surface 243c of the hooking member 243 are disengaged from each other), the elastic member 470 is able to raise the battery cover 200 in top direction through the bottom side of the guide member 410 with the elastic restoring force of the elastic member 470, thereby facilitating the battery cover 200 to be detached from the terminal body.

Figure 14:
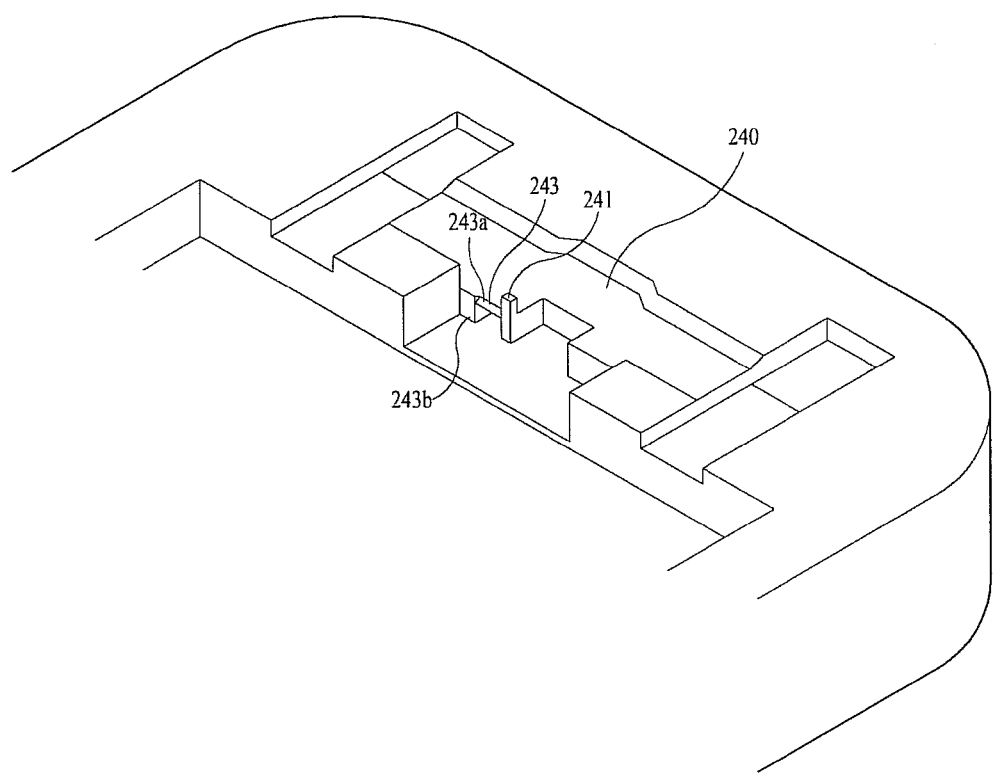
FIG. 14 is a schematic perspective diagram of a terminal body rear part included in a battery cover locking device according to a 3$^{rd}$ embodiment of the present invention.

FIG. 14 is a schematic perspective diagram of a terminal body rear part 240 included in a battery cover locking device 400 according to a $3^{rd}$ embodiment of the present invention. In FIG. 14, when a rear part of a rear case is attached to a terminal body, the terminal body rear part 240 may mean a part of the terminal body situated at a corresponding position under the rear part of the rear case.

Referring to FIG. 14, in a terminal body rear part 240, an unlocking member 241 formed in vertical direction to move the moving member 420 in a front direction by applying a pressurizing force to the $1^{st}$ projecting portion 423 (particularly, the chamfer 423a of the $1^{st}$ projecting portion 423) of the moving member 429 on moving the battery cover 200 in a lateral direction by a prescribed distance and a hooking member 243 engaged with the $2^{nd}$ projecting portion 425 (particularly, the hooking surface 425a of the $2^{nd}$ projecting portion 425) of the moving member 420 are formed.

Figure 15:
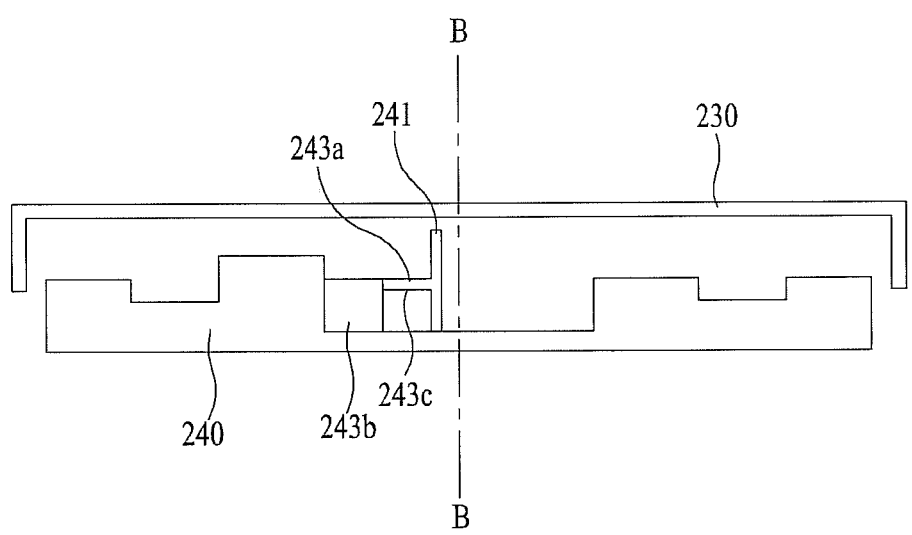
FIG. 15 is a schematic front view diagram of a terminal body rear part according to a 3$^{rd}$ embodiment of the present invention in view of front-to-rear direction.

FIG. 15 is a schematic front view diagram of a terminal body rear part 240 according to a $3^{rd}$ embodiment of the present invention in view of front-to-rear direction.

Referring to FIG. 15, an unlocking member 241 is situated in a manner of being spaced apart from a vertical center of a terminal body rear part 240 (or the rear part 230 of the rear case) so as to be situated in a space between the $1^{st}$ projecting portion 423 and the $2^{nd}$ projecting portion 425 on fixing the battery cover 200 to the terminal body. In particular, the unlocking member 241 has a bar shape and one of its surfaces plays a role as a pressurizing surface that pressurizes the chamfer of the $1^{st}$ projecting portion 423.

When the battery cover 200 is fixed to the terminal body, another surface vertical to the former surface playing a role as the pressurizing surface in the unlocking member 241 (almost) comes into contact with a start portion of the chamfer 423a of the $1^{st}$ projecting portion 423 formed on one surface at which the $1^{st}$ projecting portion 423 is formed in the moving member 420. Hence, when the battery cover 200 is moved in lateral direction by a prescribed distance, the unlocking member 241 applies a pressurizing force to the chamfer 423a to move the moving member 420 in front direction.

Referring to FIG. 15, a locking member 243 may include a horizontal portion 243a formed in horizontal direction at a prescribed height of the unlocking member 241 and a vertical portion 243b extending vertically from the horizontal portion 243a. In particular, the horizontal portion 243a may include a hooking surface 243c as a bottom surface engaged with the hooking surface 425a of the $2^{nd}$ projecting portion 425 of the moving member 420 and a sliding surface 243a as a top surface extending from the hooking surface 243c. Preferably, the sliding surface 243a includes one of an inclining surface and a convex surface.

In this case, when the battery cover 200 is fixed to the terminal body, the sliding surface of the horizontal portion 243a plays a role in moving the moving member 420 in front direction in a manner of the sliding surface 425b of the $2^{nd}$ projecting portion 425 slides thereon. When a pressurizing force is applied to one lateral side of the battery cover 200, the vertical portion 243b plays a role as a stop sill that restricts a distance of moving the moving member 420 and the battery cover 200 in a pressurizing force applied direction.

In the terminal body rear part 240, a receiving space for receiving the $1^{st}$ projecting portion 423 of the moving member 420 without any interference is formed in a space opposite to a side, on which the horizontal portion 243a is formed, centering on the unlocking member 241.

Figure 16A:
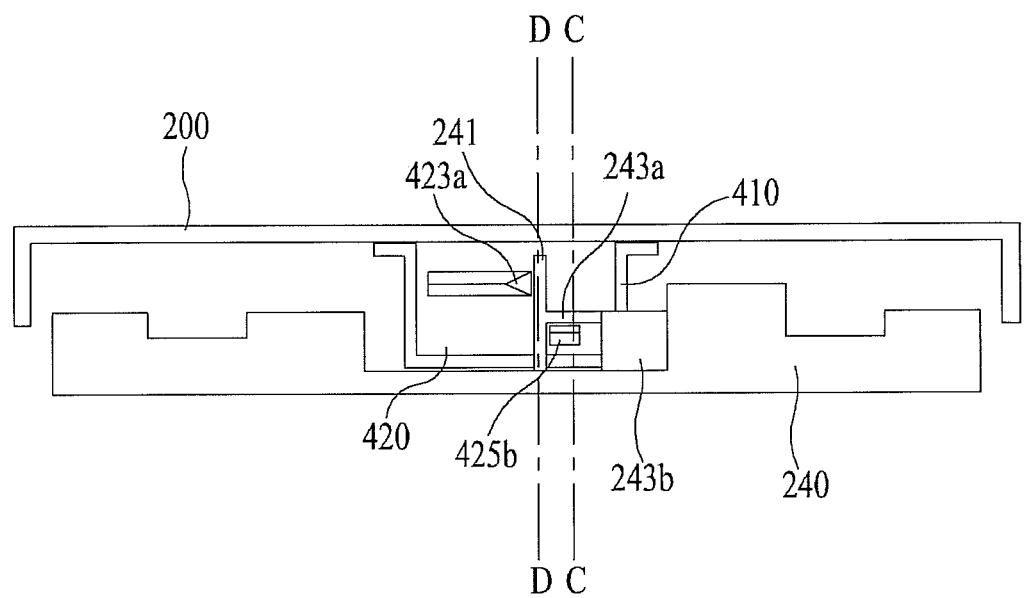
FIGS. 16A to 16C are schematic diagrams of a battery cover fixed to a terminal body according to a 3$^{rd}$ embodiment of the present invention.
Figure 16B:
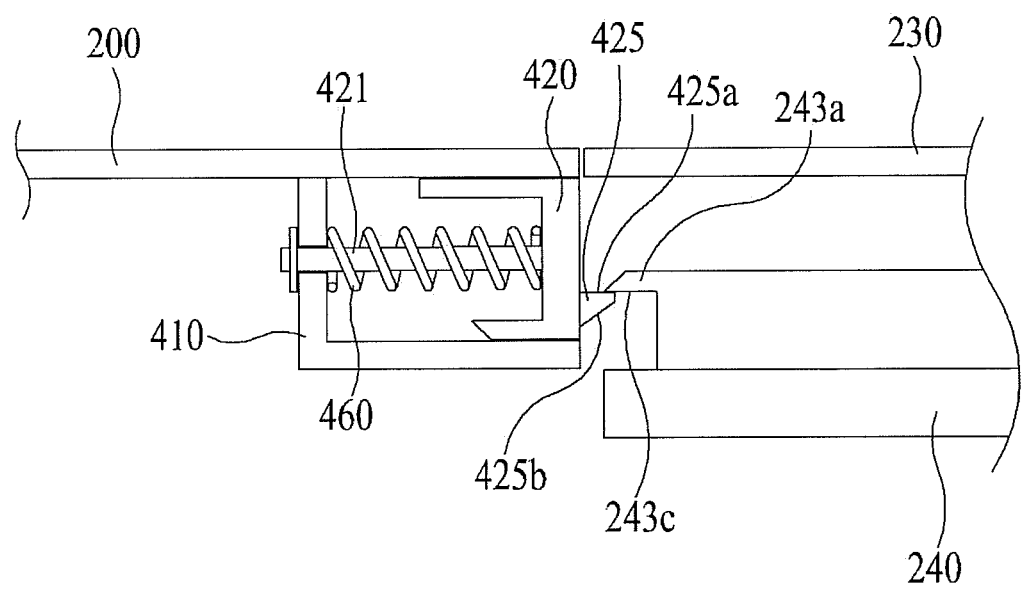
Figure 16C:
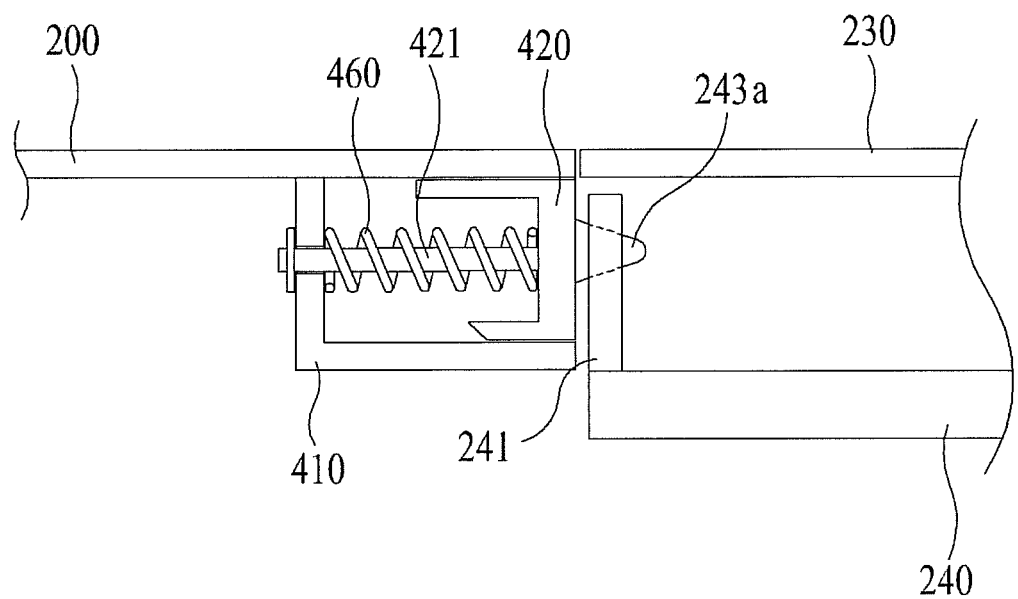

FIGS. 16A to 16C are schematic diagrams of a battery cover 200 fixed to a terminal body according to a $3^{rd}$ embodiment of the present invention. In particular, FIG. 16A is a schematic diagram of a moving member 420, a hooking member 243 and an unlocking member 241 according to a $3^{rd}$ embodiment of the present invention in view of rear-to-front direction in a state that a battery cover 200 is fixed to a terminal body. FIG. 16B is a schematic cross-sectional diagram by a cutting line C-C shown in FIG. 16A and schematically shows a $2^{nd}$ projecting portion 425 of a moving member 420 and a horizontal portion 243a of a hooking member 243. FIG. 16C is a schematic cross-sectional diagram by a cutting line D-D shown in FIG. 16A and schematically shows a 1st projecting portion 423 of a moving member 420 and an unlocking member 241.

Referring to FIG. 16A, when a battery cover 200 is fixed to a terminal body as a downward pressurizing force is applied to a top surface of one end portion (i.e., one end portion provided with a moving member 420 and a guide member 410) of the battery cover 200, a $2^{nd}$ projecting portion 425 of the moving member 420 is received under a horizontal portion 243a of a hooking member 243 and a hooking surface 425a of the $2^{nd}$ projecting portion 425 and a hooking surface 243c of the hooking member 243 are engaged with each other. In doing so, the $2^{nd}$ projecting portion 425 is situated close to an unlocking member 241 but distant from a vertical portion 243b, the unlocking member 241 is inserted in a space between the $1^{st}$ projecting portion 423 and the $2^{nd}$ projecting portion 425, and the $1^{st}$ projecting portion 423 of the moving member 420 is received in a receiving space of a terminal body rear part 240 without any interference with other components.

Referring to FIG. 16B, when a battery cover 200 is fixed to a terminal body as a downward pressurizing force is applied to a top surface of one end portion (i.e., one end portion provided with a moving member 420 and a guide member 410) of the battery cover 200, a sliding surface 425b of a $2^{nd}$ projecting portion 425 slides on a sliding surface of a horizontal portion 243a of a hooking member 243 to move the moving member 420 by a prescribed distance in front direction. After the $2^{nd}$ projecting portion 425 has been fully received under the horizontal portion 243a, the moving member 420 is moved in rear direction by a restoring force of an elastic member. Hence, a hooking surface 425a of the $2^{nd}$ projecting portion 425 and a hooking surface 243c of the hooking member 243 are engaged with each other.

Referring to FIG. 16C, when a battery cover 200 is fixed to a terminal body as a downward pressurizing force is applied to a top surface of one end portion (i.e., one end portion provided with a moving member 420 and a guide member 410) of the battery cover 200, an unlocking member has not come in contact with a chamfer 423a of a $1^{st}$ projecting portion 423 of the moving member 420 but is situated in the vicinity of a starting portion (i.e., a root side of the $1^{st}$ projecting portion 423) of the chamfer 423a.

Figure 17A:
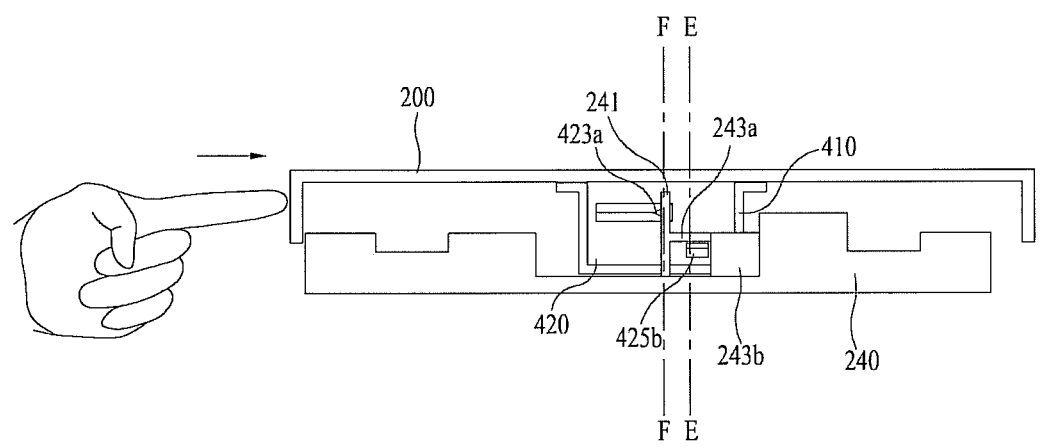
FIGS. 17A to 17C are schematic diagrams of a battery cover unlocked from a terminal body according to a 3$^{rd}$ embodiment of the present invention.
Figure 17B:
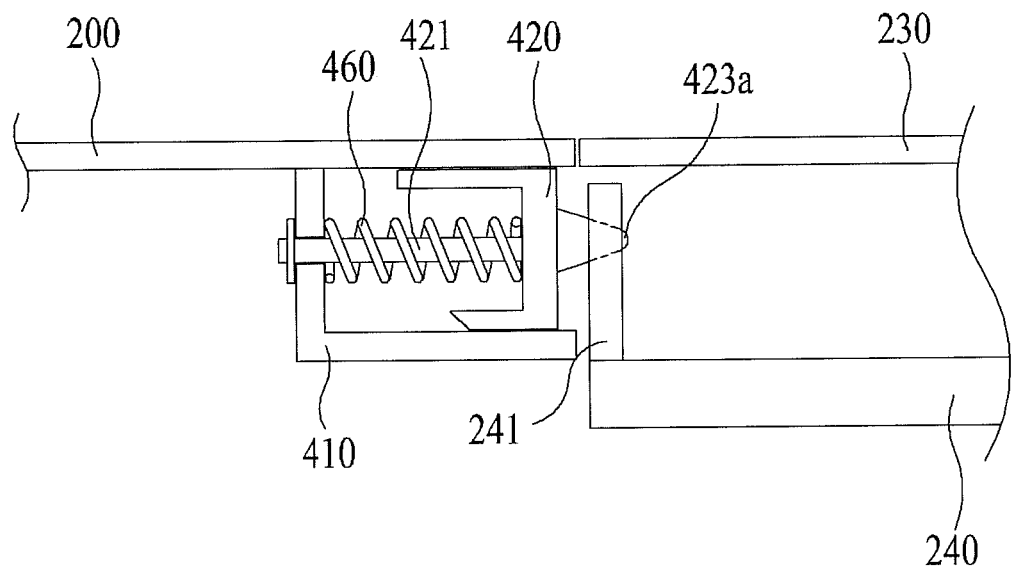
Figure 17C:
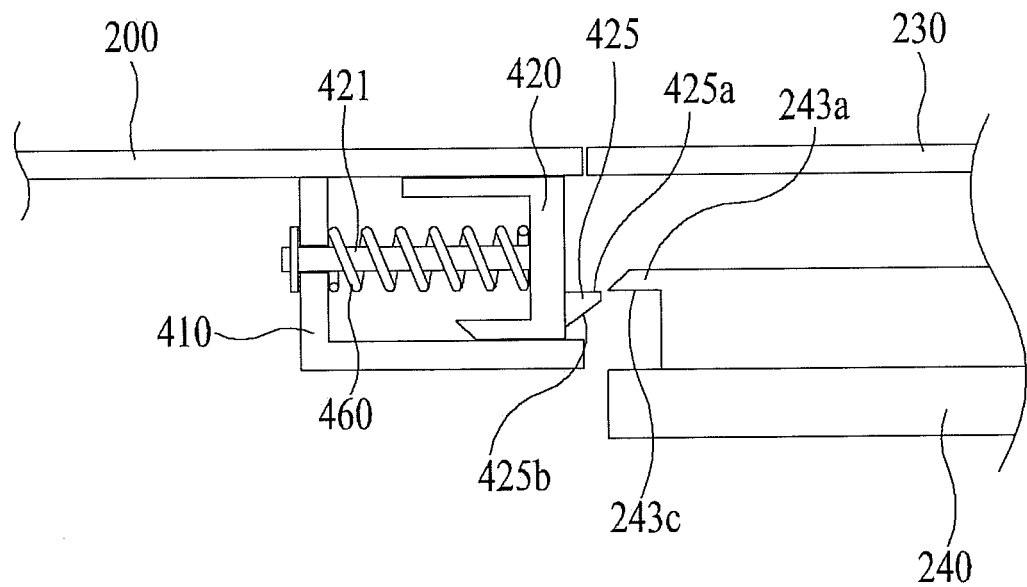

FIGS. 17A to 17C are schematic diagrams of a battery cover 200 unlocked from a terminal body according to a $3^{rd}$ embodiment of the present invention. In particular, FIG. 17A is a schematic diagram of a moving member 420, a hooking member 243 and an unlocking member 241 according to a $3^{rd}$ embodiment of the present invention in view of rear-to-front direction in a state that a battery cover 200 is detached from a terminal body. FIG. 17B is a schematic cross-sectional diagram by a cutting line C-C shown in FIG. 17A and schematically shows a $2^{nd}$ projecting portion 425 of a moving member 420 and a horizontal portion 243a of a hooking member 243. FIG. 17C is a schematic cross-sectional diagram by a cutting line D-D shown in FIG. 17A and schematically shows a $1^{st}$ projecting portion 423 of a moving member 420 and an unlocking member 241.

Referring to FIG. 17A, when a battery cover 200 and a moving member 420 are moved in right direction of a terminal body rear part 240 by a prescribed distance as a pressurizing force is applied to one lateral side (e.g., a left lateral side shown in FIG. 17A) of the battery cover 200, a $2^{nd}$ projecting portion 425 of the moving member 420 is situated distant from an unlocking member 241 but close to a vertical portion 243b and the unlocking member 241 pressurizes a chamfer of a $1^{st}$ projecting portion 423 to move the $1^{st}$ projecting portion 423 and the moving member 420 in front direction. Hence, a hooking surface 425a of the $2^{nd}$ projecting portion 425 is disengaged from a hooking surface 243c of a horizontal portion 243a, whereby the battery cover 200 is detached from the terminal body. In doing so, as mentioned in the foregoing description, an elastic restoring force of an elastic member provided under a guide member facilitates the battery cover to be detached from the terminal body.

Referring to FIG. 17B, when a moving member 420 is moved in right direction of a terminal body rear part 240 by a prescribed distance as a pressurizing force is applied to one lateral side (e.g., a left lateral side shown in FIG. 17A) of a battery cover 200, an unlocking member 241 pressurizes a chamfer 423a of a $1^{st}$ projecting portion 423. Hence, the chamfer 423a of the $1^{st}$ projecting portion 423 slides by a pressurizing force of the unlocking member 241 to move the moving member 420 in front direction by a prescribed distance. In dong so, the unlocking member 241 comes in contact with the chamfer 423a and is situated close to a free end portion of the $1^{st}$ projecting portion 423.

Referring to FIG. 17C, when a battery cover 200 and a moving member 420 are moved in right direction of a terminal body rear part 240 by a prescribed distance as a pressurizing force is applied to one lateral side (e.g., a left lateral side shown in FIG. 17A) of the battery cover 200, the moving member 420 is moved by a chamfer 423a and an unlocking member 241 in front direction by a prescribed distance, whereby a hooking surface 425a of a $2^{nd}$ projecting portion 425 and a hooking surface 243c of a hooking member 243 are disengaged from each other. Hence, the battery cover 200 is detached from the terminal body.

Accordingly, the present invention provides the following effects and/or advantages.

First of all, the present invention does not require a slot configured to expose a battery cover locking device externally or an outer button configured to cancel a locked state of the battery cover locking device and the like, thereby enhancing the exterior beauty of a mobile terminal overall.

Secondly, if a user applies a downward pressurizing force to a rear case of a mobile terminal or applies a lateral pressurizing force to one lateral side of a battery cover, the battery cover is facilitated to be detached from a terminal body. Therefore, the present invention enhances user's convenience.

Finally, the present invention facilitates a battery cover to be detached from a terminal body using a small number of components only.

The aforementioned embodiments of the mobile terminal 100 are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

The mobile terminal 100 described above is applicable, not limited to the configuration and method described in the embodiments, but to some or entire combinations of the embodiments such that various modifications are made available.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a body including a rear case having a front part and a rear part;
a battery received in the body;
a battery cover detachably provided between the front part and the rear part to protect the battery against external environment;
a guide member fixed to an inner surface of one end portion of the battery cover;
a moving member received in the guide member to be guided by the guide member to move in front and rear directions; and a hooking member provided within the body, the hooking member including a hooking surface engaged with the moving member to fix the battery cover to the body.

2. The mobile terminal of claim 1, the guide member comprising:
   a backside portion configured to restrict a backward moving distance of the moving member;
   at least one opening provided to the rear portion; and
   a stop sill configured to restrict a rear-directional moving distance of the moving member.

3. The mobile terminal of claim 2, the moving member comprising at least one guide projection configured to penetrate the at least one guide opening provided to the guide member.

4. The mobile terminal of claim 3, further comprising an elastic member provided between the moving member and the backside portion of the guide member to be penetrated by the guide member.

5. The mobile terminal of claim 1, wherein an elastic member is provided to the body to apply an elastic restoring force to a bottom surface of the guide member.

6. The mobile terminal of claim 1, wherein a slot is formed at one end portion of the battery cover having the guide member provided thereto to detach the battery cover.

7. The mobile terminal of claim 6, the moving member comprising:
   a hooking sill having a hooking surface engaged with the hooking surface of the hooking member; and
   a push sill provided toward the inner surface of the battery cover.

8. The mobile terminal of claim 7, wherein the push sill includes a push surface configured to come in contact with a user's fingernail and wherein the push surface comprises either an inclining surface or a convex surface.

9. The mobile terminal of claim 7, wherein the hooking member includes a sliding surface extending from the hooking surface, wherein the hooking sill of the moving member includes a sliding surface extending from the hooking surface, and wherein the sliding surface comprises either an inclining surface or a convex surface.

10. The mobile terminal of claim 1, wherein an unlocking member and the hooking member are included in an inner surface of the rear part, and wherein the unlocking member has a pressurizing projection configured to deliver a pressurizing force working downward from one end portion of the rear part to the moving member.

11. The mobile terminal of claim 10, wherein a top surface of the pressurizing projection comprises either an inclining surface or a convex surface and a bottom surface of the pressurizing projection comprises either an inclining surface or a convex surface.

12. The mobile terminal of claim 10, wherein the one end portion of the rear part provided with the unlocking member is configured to elastically reciprocate at a prescribed height.

13. The mobile terminal of claim 10, wherein the hooking member is configured with 'L' shape and wherein the hooking member is arranged by being spaced apart from the unlocking member in rear direction by a prescribed distance.

14. The mobile terminal of claim 10, the moving member comprising:
   a $1^{st}$ projecting portion provided to an upper portion of the moving member to receive the pressurizing force from the pressurizing projection; and
   a $2^{nd}$ projecting portion provided to a lower portion of the moving member, the $2^{nd}$ projecting portion having a hooking surface configured to be engaged with the hooking surface of the hooking member.

15. The mobile terminal of claim 14, the $1^{st}$ projecting portion comprising:
   a pressurized surface receiving the pressurizing force from a bottom surface of the pressurizing projection; and
   a sliding surface extending from the pressurized surface to have a top surface of the pressurizing projection slide thereon.

16. The mobile terminal of claim 1, the moving member comprising:
   a $1^{st}$ projecting portion configured to move the moving member in front direction by delivering a pressurizing force working in lateral direction of the battery cover to the moving member; and
   a $2^{nd}$ projecting portion having a hooking surface configured to be engaged with the hooking surface of the hooking member.

17. The mobile terminal of claim 16, wherein the $1^{st}$ projecting portion is situated in the moving member in a manner that a vertical center of the $1^{st}$ projecting portion is eccentric in one direction from a vertical center of the moving member.

18. The mobile terminal of claim 17, wherein a chamfer is provided to one lateral side situated close to the vertical center of the moving member between both lateral sides of the $1^{st}$ projecting portion and wherein the chamfer includes either an inclining surface or a convex surface.

19. The mobile terminal of claim 17, wherein the $2^{nd}$ projecting portion is situated in the moving member at a position spaced by a prescribed distance from one lateral side situated close to the vertical center of the moving member between both lateral sides of the $1^{st}$ projecting portion.

20. The mobile terminal of claim 16, wherein the $2^{nd}$ projecting portion includes a sliding surface extending from the hooking surface and wherein the siding surface comprises either an inclining surface or a convex surface.

21. The mobile terminal of claim 16, wherein an unlocking member and the hooking member are provided under the rear part, and wherein the unlocking member is configured in vertical direction to move the moving member in front direction by applying the pressurizing force to the $1^{st}$ projecting portion on moving the battery cover by a prescribed distance in lateral direction.

22. The mobile terminal of claim 21, wherein the unlocking member is situated by being spaced apart by a prescribed distance from a vertical center of the rear part.

23. The mobile terminal of claim 21, the hooking member comprising:
   a horizontal portion formed in horizontal direction from the unlocking member, the horizontal portion having an inclining or convex sliding surface on a top surface extending from the hooking surface; and
   a vertical portion extending vertically from the horizontal portion.

* * * * *